United States Patent
Noda et al.

(10) Patent No.: US 7,363,108 B2
(45) Date of Patent: Apr. 22, 2008

(54) ROBOT AND CONTROL METHOD FOR CONTROLLING ROBOT EXPRESSIONS

(75) Inventors: Kuniaki Noda, Tokyo (JP); Takashi Yamamoto, Tokyo (JP); Tatsunori Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 660 days.

(21) Appl. No.: 10/771,685

(22) Filed: Feb. 4, 2004

(65) Prior Publication Data

US 2004/0210345 A1    Oct. 21, 2004

(30) Foreign Application Priority Data

Feb. 5, 2003    (JP)    ............................. 2003-028897

(51) Int. Cl.
*G06F 19/00* (2006.01)
(52) U.S. Cl. ................. 700/245; 700/258; 318/568.12; 318/568.13; 318/568.16
(58) Field of Classification Search ................ 700/245, 700/258; 318/568.12, 568.13, 568.16
See application file for complete search history.

(56) References Cited

U.S. PATENT DOCUMENTS

| 6,442,450 B1* | 8/2002 | Inoue et al. ................. 700/245 |
| 6,519,506 B2* | 2/2003 | Osawa ........................ 700/245 |
| 2002/0081937 A1* | 6/2002 | Yamada et al. ............. 446/175 |
| 2003/0004611 A1* | 1/2003 | McKinney et al. ......... 700/258 |

FOREIGN PATENT DOCUMENTS

| JP | 2000-218065 | 8/2000 |
| JP | 2001 212782 | 8/2001 |
| JP | 2001-353674 | 12/2001 |
| JP | 2002-66155 | 3/2002 |
| JP | 2002-120181 | 4/2002 |
| JP | 2002-154081 | 5/2002 |
| JP | 2002-175091 | 6/2002 |
| JP | 2002 307350 | 10/2002 |
| JP | 2002-370185 | 12/2002 |

* cited by examiner

*Primary Examiner*—Khoi H. Tran
*Assistant Examiner*—Marie A Weiskopf
(74) *Attorney, Agent, or Firm*—Frommer Lawrence & Haug LLP; William S. Frommer; Thomas F. Presson

(57) ABSTRACT

A robot apparatus which, by exploiting limited resources highly efficiently, is capable of making expressions matched to the motion or to complex variegated feeling or instinct states, representing the crucial information in achieving smooth communication with the human being, is disclosed. A method of expression by the robot apparatus is also disclosed. The robot apparatus expresses plural states, such as emotional states or the processing states of perceptual recognition, by a light radiating device loaded at a location of the head part of the humanoid robot apparatus walking on two legs. The light radiating device includes e.g. the color hue, saturation and patterns of light emission as expressive units represented independently of one another. A plural number of orthogonal states, that is, the emotional states and the states of perceptual recognition, are expressed simultaneously, using a plural number of the orthogonal representations of the light radiating device correlated by a unit for correlating plural reciprocally orthogonal states, derived from the own inner states or external stimuli, with at least one expressive unit.

18 Claims, 26 Drawing Sheets

Resourece Tree Map

| Pioneer command | | | |
|---|---|---|---|
| | Only BG | Only FG | FG and BG |
| BG | Overwrite with late BG | Remains as FG | Remains as FG |
| FG | Overwrite with late FG | Overwrite with late FG | Overwrite with late FG |
| Late command | | | |

FIG.25

ROBOT AND CONTROL METHOD FOR CONTROLLING ROBOT EXPRESSIONS

BACKGROUND OF THE INVENTION

1. Field of the invention

This invention relates to a robot apparatus of the type walking on two legs, which robot apparatus is capable of performing autonomous motions responsive to external stimuli or inner states, and a method of status expression by the robot apparatus.

This application claims the priority of the Japanese Patent Application No. 2003-028897 filed on Feb. 5, 2003, the entirety of which is incorporated by reference herein.

2. Description of Related Art

A mechanical apparatus for performing the motion simulating the movements of the human being, using the electrical or magnetic operations, is termed a "robot". The robot started to be used extensively towards the end of the sixties. Most of the robots used were industrial robots, such as manipulators or transporting robots, aimed at automating or performing unmanned operations in plants.

Recently, developments of practical robots, supporting the human life as a partner of the human being, that is, supporting human activities in variable aspects of living environments or other situations in the human life, are under way. In distinction from the industrial robots, these practical robots have the ability to learn on their own the method of adapting themselves to individuals having different personalities in variable aspects of the human living environment or to variable environments. For example, a pet type robot, simulating the bodily mechanism or movements of quadruples, e.g. dogs or cats, or a humanoid robot, simulating the bodily mechanism or movements of animals erected and walking on feet, such as human beings, is already being put to practical utilization.

These robot apparatus are capable of performing various movements, with emphasis placed on entertainment properties, as compared to industrial robots, and hence are sometimes termed entertainment robot apparatus. Among these robot apparatus, there are those which act autonomously in dependency upon the information from outside or to the own inner states.

In the autonomous type robot apparatus, for example, the pet type robot apparatus, simulating the animals, such as dogs, the inner state expressing means, expressing the inner states, such as the emotional/feeling states, may be provided for smoothing the communication with the user.

Up to now, as these inner state expressing means, such a method has been used in which a light radiating device, effectively operating as an eye, is provided and turned on/off, or in which a square-shaped light radiating device is provided on the head part and is changed in color and luminance.

For example, the conventional robot apparatus, stated in the Patent Publication 1 (Japanese Laying-Open Patent Publication 2001-353674, is provided with light radiating means of a predetermined shape, effectively operating as an eye, for possibly expressing the feelings, such as 'anger' or 'happiness' responsive to the actions from the user, such as 'patting' or 'stroking', in order to transmit the feeling of the robot apparatus to the user by the turning on/off of the light radiating means.

If the robot apparatus is able to express the emotional state in this manner, the user is able to communicate smoothly with the pet type robot, while the user's affection and curiosity to the robot apparatus are correspondingly instigated to improve the entertainment characteristics of the robot apparatus further.

However, the conventional robot apparatus, stated in the above Patent Publication 1, needs to be provided with a different number of expression means in order to express a corresponding number of different emotional states or different perceptual recognition processing states. These expression means may be resources, including an actuator, first of all, in addition to the aforementioned light radiating means. However, in order to implement a robot apparatus requested to act autonomously in household environments, limitations are imposed on the physical weight and size, and hence on the expression means loaded on the robot apparatus, in favor of safety and portability. Thus, there is presented a problem that it is difficult to provide a number of the expression means equal to the number of the states owned by the robot apparatus.

On the other hand, if only expression means lesser in number than the contents of expression are usable, different expressions cannot be output except if the expressions of certain expression contents are interrupted. For example, the expressions of the emotional state need to be interrupted if the event of the voice heard (state of perceptual recognition processing) is to be displayed.

Moreover, as for the method for expressing the feeling, the emotional states are expressed solely by discrete color representations, for example, the color of the light represented by the light radiating device is green or orange for indicating 'happiness' or 'anger', respectively, such that it is not possible to make continuous representations of the inner state, such as how much the robot apparatus is 'happy', which is indispensable for enhancing the mutual understanding between the robot apparatus and the user.

In addition, as for the control method for the light radiating device, the routine practice is to specify the changes in color and luminance (pattern of light radiation) simultaneously to prepare a pattern file and to reproduce the pattern thus prepared at the outset to control the light radiation.

However, if the changes in color and luminance are specified simultaneously to prepare a pattern file, the changes in color and luminance need to be specified simultaneously. Should the expressions be made so that different meanings are imparted to the respective expression means in making the expressions, it is necessary to provide the number of files corresponding to the number of the combinations of the color and the luminance. Should the number of the combinations be larger, command management becomes more complex. Moreover, it is undesirable for the robot apparatus with limited resources to supervise the plural number of the commands.

On the other hand, the control command for the light radiating device is generally issued only when the output state has been changed. The routine practice is that, except if a new command is issued, the state which prevailed when the command has been issued last time is maintained.

However, if the light radiating device is controlled by a scheme in which the changes in color and luminance are specified simultaneously and in which the last state at the time point of end of the command is maintained, difficulties are met in processing an interrupt event during the time of steady status representations. That is, if an interrupt event, such as dancing performance, is carried out under a state steady status representations, such as representations of the emotional state, the turn-on state at the time point of completion of the dancing performance is maintained, except if the command for representing the emotional state is reissued at a time point of completion of the interrupt event.

For coping with this problem, it is necessary for the side issuing a command for representing the steady state to monitor the timing of the end of the interrupt event to re-issue the command. Moreover, in case the interrupt event processing is a command which should be executed in preference to the steady state representations, it is necessary for the command output of the steady state representations to monitor the state of the preferential command and to suppress the own command output.

An object which verifies the behavior is made up by behavior stating modules, each stating the behavior discretely autonomously, and outputs a command at an optional timing. Thus, when the command output control is to be made, the status of other modules needs to be monitored within the behavior stating modules. It is, however, highly inefficient to state the processing for the interrupt event in all of the modules to monitor the relationship among the modules.

SUMMARY OF THE INVENTION

In view of the above-depicted status of the art, it is an object of the present invention to provide a robot apparatus and a method for representing the statuses thereof, in which expressions matched to the motion or the states of the complicated variegated feeling or instinct, as the crucial information for realization of smooth communication between the robot apparatus and the human being, may be achieved by exploiting the limited resources highly efficiently.

For accomplishing the above object, the present invention provides a robot apparatus capable of performing autonomous motion based on inner states and/or external stimuli, comprising expression means having a plurality of expressive units capable of being orthogonally expressed independently of one another, correlating means for correlating a plurality of orthogonal states, which are based on the inner states and/or external stimuli, with at least one of the expressive units, and control means for controlling the expression means for representing the plural orthogonal states in parallel, using the correlated expressive units.

According to the present invention, the expression means has plural expressive units that may be expressed orthogonally, so that plural orthogonal states can be expressed in parallel. Since these orthogonal states may be controlled independently of one another, two or more expressive units may be combined and used simultaneously without competition among the resources, such that many states can be expressed by employing the expression means to high efficiency.

The control means may control the expression means by expressive units having the parameter variably controlled in keeping with the respective expressive elements of the above states. The plural expressive elements may be expressed by sole expressive means by variably controlling the parameters of the hue or saturation (expressive units) in the case of a light radiating device, in dependency upon e.g. the sort or the strength of the feeling, represented by the expressive element of the emotional state or the sort of the subject of recognition, represented by the expressive element of the state of recognition.

The expression means includes a light radiating device, such as an LED, while the plural expressive units, that may be orthogonally represented independently of one another, include two or more of the color hue, saturation, intensity and the light radiating time. The expression means may be uttering means, in which case the plural expressive units that may be orthogonally represented independently of one another may include two or more of sound pitch, sound volume and rhythm. By using these expressive units, respective different orthogonal expressions may be made in parallel simultaneously.

The robot apparatus may be of an outer shape like that of an animal, and the light radiating device may be provided at a location corresponding to an eye of the animal, thereby further smoothing the communication when the robot apparatus and the human being face to and talk with each other.

The correlating means outputs the correlation by control commands different in the priority sequence, the control means in case of issuance of plural control commands different in the priority sequence prioritizing the control command higher in the priority sequence. Thus, if plural control commands are issued in a multiplexed form, the control command higher in the priority sequence takes precedence to control the expression means autonomously.

A robot apparatus for selecting and executing at least one of a plurality of motions comprises expression means having expressive units variably controlled by parameters, command issuing means for issuing a control command on motion selection, and control means for controlling the expressive means by the control command. The control command is such a one in which the expressive units variably controlled by the parameter are correlated with the selected motion. The control command has a priority sequence. The control means on issuance of plural control commands different in the priority sequence controls the expressive means in accordance with the control command higher in the priority sequence.

According to the present invention, the priority sequence is imparted to the commands controlling the expression means performing the expressions matched to the selected motion. Since the expression means are controlled in accordance with the control command higher in the priority sequence, competition for resources may be prevented from occurring even if plural control commands are issued simultaneously.

If a control command higher in the priority sequence than the control command controlling the expression means performing the expressions is issued, the control means interrupts the expressions to control the expression means in accordance with the control command higher in the priority sequence. When the expressions under the control command higher in the priority sequence have come to a close, the expressions interrupted may be recommenced. Since the expression means are automatically controlled in dependency upon the rank in the priority sequence of the control command, there is no necessity for monitoring the beginning timing or the end timing of the control command higher in the priority sequence.

A method for expression by a robot apparatus capable of performing autonomous motion based on inner states and/or external stimuli, according to the present invention, comprises a correlating step of correlating a plurality of orthogonal states, which are based on the inner states and/or external stimuli, with at least one of a plurality of expressive units capable of being orthogonally expressed independently of one another, and a control step of controlling the expression means for representing the plural orthogonal states in parallel, using the correlated expressive units.

A method for expression by a robot apparatus in which at least one of a plurality of motions is selected and executed, according to the present invention, comprises a command issuing step of issuing, on motion selection, a control command in which an expressive unit variably controlled by a parameter owned by expression means is issued for the selected motion, and a control step of controlling the expression means by the control command. The control command has a priority sequence. The expression means is controlled in the control step by a control command higher in the priority sequence when a plurality of control commands different in the priority sequence are issued.

According to the present invention, the robot apparatus capable of performing autonomous motion based on inner states and/or external stimuli comprises expression means having a plurality of expressive units capable of being orthogonally expressed independently of one another, correlating means for correlating a plurality of orthogonal states, which are based on the inner states and/or external stimuli, with at least one of the expressive units, and control means for controlling the expression means for representing the plural orthogonal states in parallel, using the correlated expressive units. Since the plural orthogonal states to be expressed by the expression means may be expressed by orthogonal expressive units, independently of one another, plural orthogonal states may be allowed to co-exist in the sole expression means. In addition, complex status expressions may be made by a smaller number of expression means based on the combination of the orthogonal states. In this manner, multifarious expressions may be made efficiently even in case a large number of functions as expressive means for the inner states cannot be loaded because of limitations on the physical weight and size of the robot apparatus. The user is able to grasp plural statuses of the robot apparatus without the necessity of directing his/her attention to plural expression means simultaneously, thus achieving smooth communication between the robot apparatus and the user in real-time.

According to the present invention, the robot apparatus for selecting and executing at least one of a plurality of motions comprises expression means having expressive units variably controlled by a parameter, command issuing means for issuing a control command on motion selection, and control means for controlling the expressive means by the control command. The control command is such a one in which the expressive units variably controlled by the parameter are correlated with the selected motion. The control command has a priority sequence. The control means on issuance of plural control commands different in the priority sequence controls the expressive means in accordance with the control command higher in the priority sequence. The control command controlling the expression means is provided with the priority sequence by way of multiplexing. The switching control among simultaneously output plural commands may be facilitated, while the program in module designing may be simplified.

BRIEF DESCRIPTION OF THE DRAWINGS

FIG. 18A shows an LED light radiating device, in a plan view and a side view, and FIG. 18B is a circuit diagram showing an inner circuit of the LED light radiating device.

FIG. 25 illustrates the priority sequence of commands.

DESCRIPTION OF PREFERRED EMBODIMENTS

Figure 1:
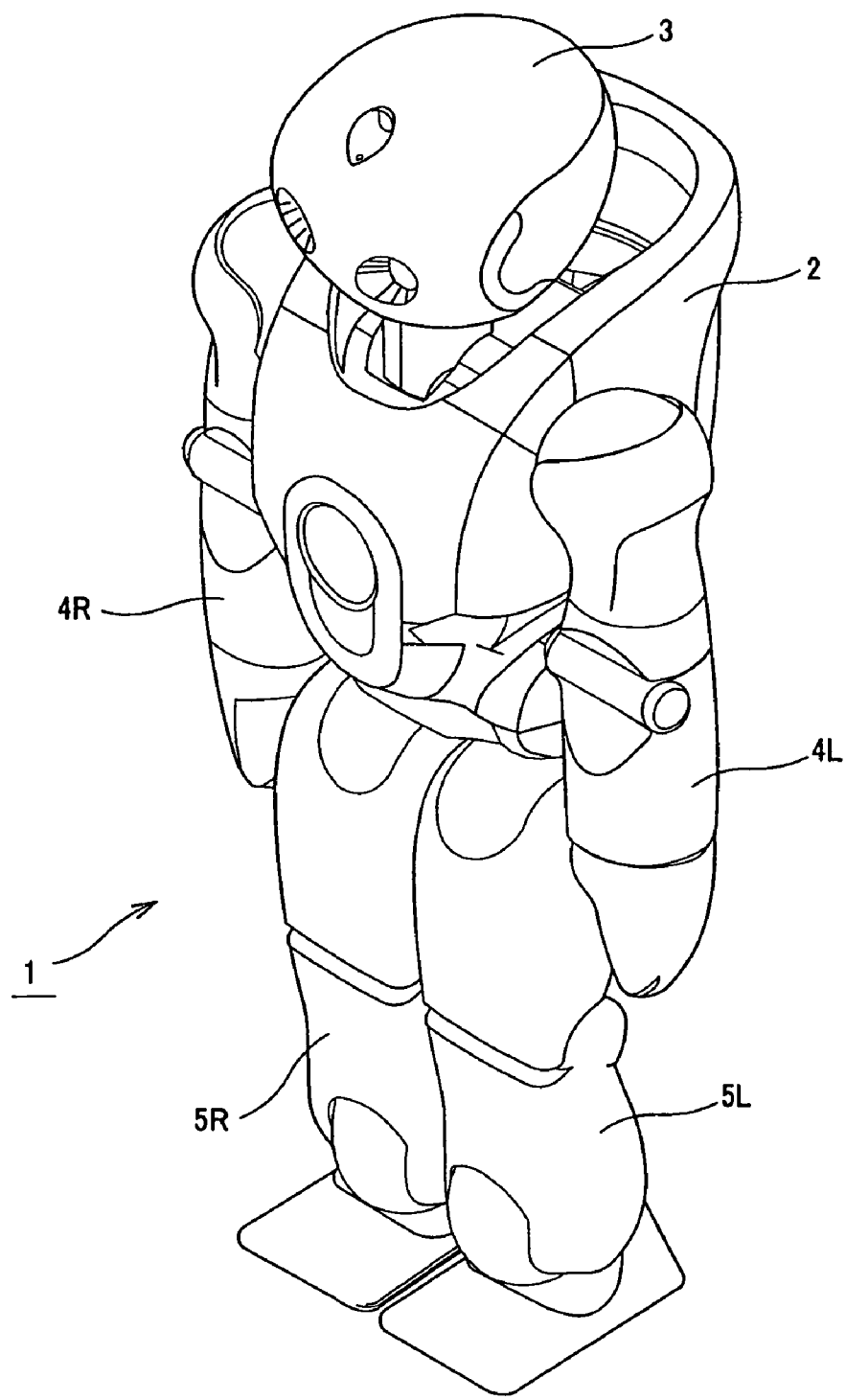
FIG. 1 is a perspective view showing the appearance of a robot apparatus embodying the present invention.

Referring to the drawings, certain preferred embodiments of the present invention are now explained in detail. In the present embodiment, the present invention is applied to a robot apparatus for expressing the expressions corresponding to plural states, such as emotional states or states of perceptual recognitions, which represent the crucial information in realizing smooth communication between the robot apparatus and the human being, or the expressions corresponding to the behavior exhibited, using expression means having plural expression units. Specifically, the robot apparatus is a humanoid robot, walking on two legs, and carries a light radiating device, as expression means, at a site corresponding to the eye and the ear on the head unit of the robot apparatus. The light radiating device is such a one in which the color hue, intensity, saturation and the patterns of light emission, as expressive units, may be adjusted as respective continuous values (that is, orthogonally represented) temporally independently of one another. These expressive units are variably combined to make expressions in keeping with the robot motion. Here, the structure of the robot apparatus of the present embodiment is first explained.

(1) Structure of the Robot Apparatus

FIG. 1 is a perspective view showing the appearance of a robot apparatus 1 of the present embodiment. Referring to FIG. 1, showing the robot apparatus 1, a head unit 3, left and right arm units 4R/L, and left and right leg units 5R/L, are connected to preset positions of a body trunk unit 2. Meanwhile, R and L are suffixes indicating right and left, respectively.

Figure 2:
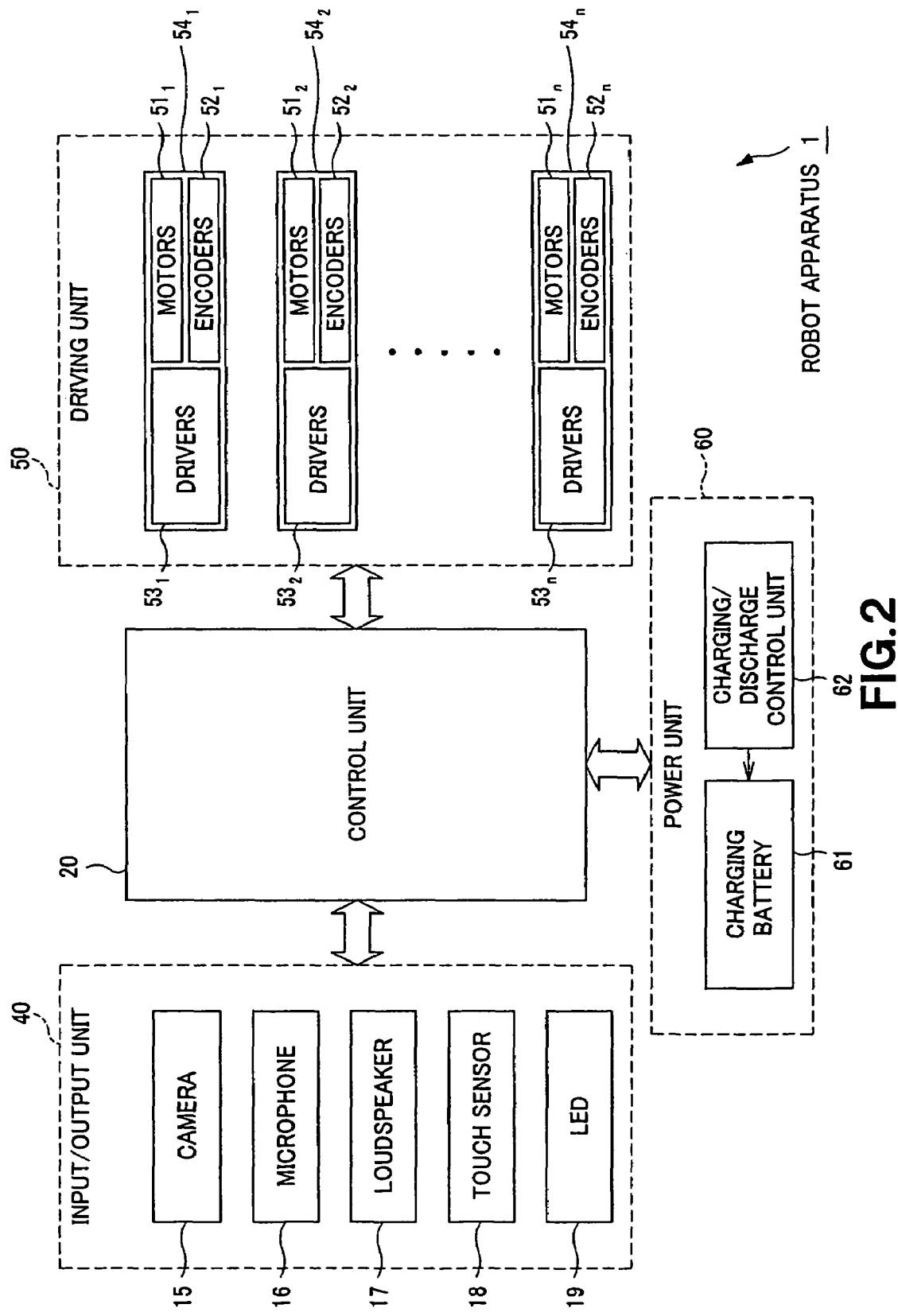
FIG. 2 is a schematic block diagram showing the functional structure of a robot apparatus embodying the present invention.

FIG. 2 is a block diagram showing the appearance of the robot apparatus 1 of the present embodiment. Referring to FIG. 2, the robot apparatus 1 is made up by a control unit 20 for performing comprehensive control of the entire operation and other data processing operations, an input/output unit 40, a driving unit 50 and a power unit 60. These respective units are hereinafter explained.

The input/output unit 40 includes, as input units, a CCD camera 15, equivalent to the eye of the human being and adapted for imaging an outside status, a microphone 16, equivalent to the ear of the human being, a touch sensor 18, mounted on a site, such as the head unit or the back, of the robot apparatus, and adapted for electrically detecting a preset pressure to sense the user's touch, a distance sensor for measuring the distance up to a forwardly located object, and a variety of sensors equivalent to the five senses of the human being. The input/output unit 40 also includes, as output units, a loudspeaker 17, provided to the head unit 3, and which is equivalent to the mouth of the human being, and an LED light radiating device 19, provided to a location corresponding to the position of the eye in the human being, and operating as means for expressing plural states derived from changes in the inner state and/or external stimuli, that is, the states of feeling or the states of visual recognition, based on the combination of turn-on and turn-off states, the turn-on timing and on the coloration, as will be explained subsequently. These output devices are capable of expressing the feedback to the user from the robot apparatus 1, by e.g. the voice or the turning on/off of the LED light radiating device 19, thus in a form different than patterns of mechanical exercises, such as by leg units.

For example, plural touch sensors 18 may be provided at preset sites on the scalp of the head unit and contact detection by the touch sensors 18 may be exploited in a compound fashion to detect actions from the user, for example, 'stroking', 'patting' or 'light patting' at the head unit of the robot apparatus 1. The corresponding change in the inner state is expressed by the LED light radiating device 19. For example, in case it is detected that contact on certain ones of the pressure sensors sequentially at a preset longer time interval, this action is verified to be 'stroking', whereas, in case it is detected that such contact at a preset shorter time interval, this action is verified to be 'patting', by way of case sorting, and corresponding changes in the inner state are expressed by reflection in the operations of the LED light radiating device.

The driving unit 50 is a functional block for realizing the motion of the body unit of the robot apparatus 1 in accordance with a preset motion pattern commanded by the control unit 20. The driving unit 50 is a functional module for implementing the degrees of freedom in the joints of the robot apparatus 1, and is made up by plural driving units $54_1$ to $54_n$ provided for each of the roll, pitch and yaw axes of respective joints. The driving units $54_1$ to $54_n$ are composed of the combination of motors $51_1$ to $51_n$ for effecting rotational motion about a preset axis, encoders $52_1$ to $52_n$ for detecting the rotational positions of the driving units $54_1$ to $54_n$ and drivers $53_1$ to $53_n$ for adaptively controlling the rotational positions or the rotational speeds of the motors $51_1$ to $51_n$ based on outputs of the encoders $52_1$ to $52_n$.

Although the present robot apparatus 1 is designed to walk on two legs, the robot apparatus 1 may be designed as a robot walking on four legs, depending on the combination of the driving units.

The power unit 60, as its name implies, is a functional module for feeding electrical power to respective electrical circuits in the robot apparatus 1. The robot apparatus 1 of the present embodiment is of the autonomous driving type employing a battery. More specifically, the power unit 60 is made up by a charging battery 61, and a charging/discharge control unit 62 for supervising the charging/discharge state of the charging battery 61.

The charging battery 61 is formed e.g. as a 'battery pack' comprised of plural lithium ion secondary battery cells, packaged into a cartridge.

The charging/discharge control unit 62 measures the terminal voltage, charging/discharge current quantity of the battery 61 and the ambient temperature of the battery 61 to grasp the residual capacity of the battery 61 to determine the charging start time and charging end time. The charging start time and charging end time, as determined by the charging/discharge control unit 62, are notified to the control unit 20 for use as a trigger for the robot apparatus 1 to start and terminate the charging operation.

The control unit 20 is equivalent to the 'brain' of the human being, and may be loaded on e.g. the head or on the trunk of the body unit of the robot apparatus 1.

Figure 3:
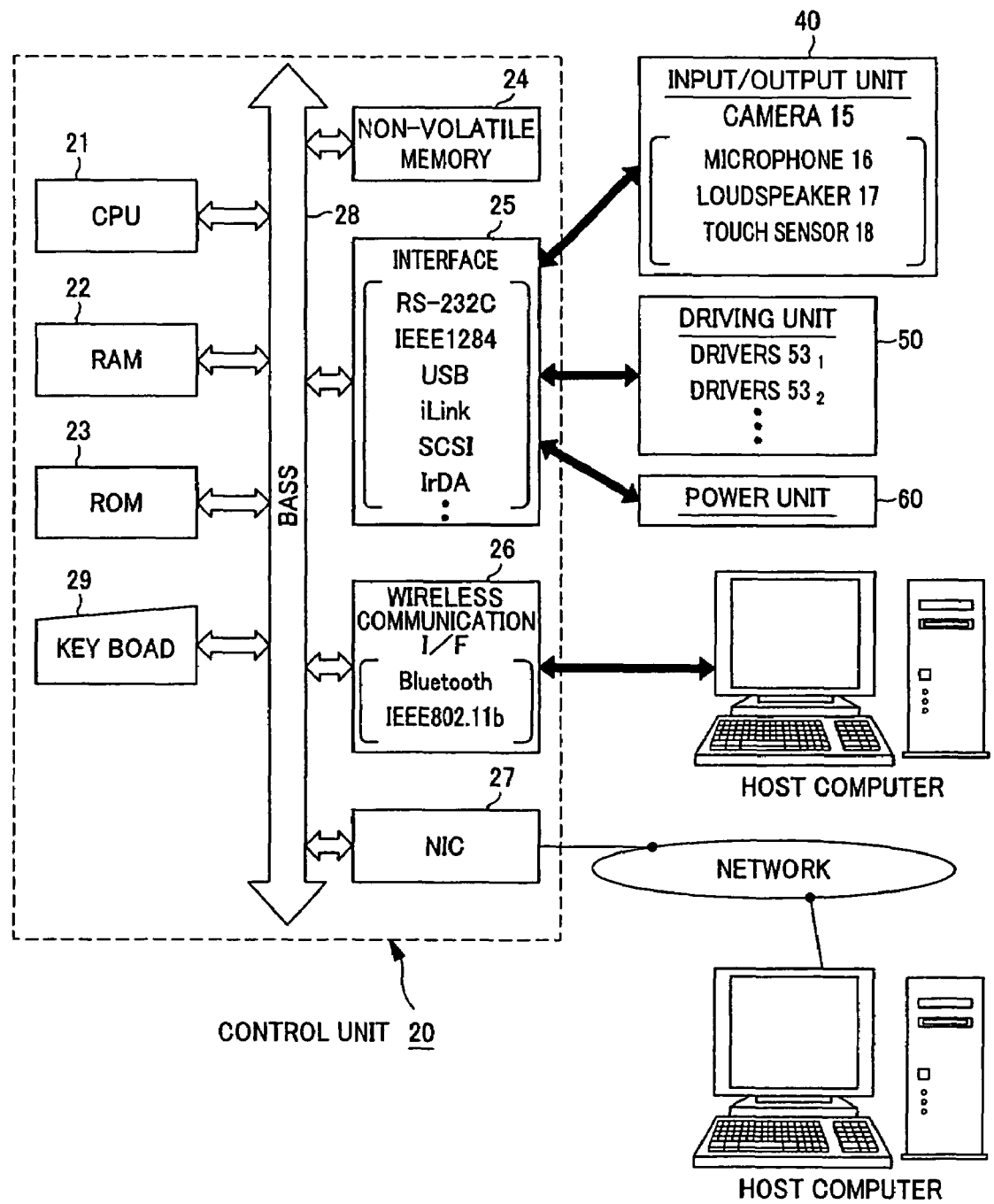
FIG. 3 is a block diagram showing the structure of a control unit of the robot apparatus embodying the present invention.

FIG. 3 shows, in a block diagram, the structure of the control unit 20 in further detail. Referring to FIG. 3, the control unit 20 is made up by a central processing unit (CPU) 21, as a main controller, connected over a bus to a memory and other circuit components and peripherals. A bus 28 is a common signal transmission path including e.g. a data bus, an address bus and a control bus. To each of the devices on the bus 28 is allocated an address inherent in the device, such as a memory address or an I/O address. By specifying these addresses, the CPU 21 is able to communicate with the particular devices on the bus.

A random access memory (RAM) 22 is a writable memory, formed by a non-volatile memory, such as a DRAM (dynamic RAM), and is used for loading of program codes to be executed by the CPU 21 and for transient storage of work data by a program under execution.

A read-only memory (ROM) 23 is used for permanent storage of programs or data. Among the program codes, stored in the ROM 23, there are, for example, a self-diagnosis test program, to be executed on power up of the robot apparatus 1, and an operation control program for prescribing the motion of the robot apparatus 1.

Among the control programs for the robot apparatus 1, there are, for example, a 'sensor input recognition processing program' for processing sensor inputs, such as inputs from the camera 15 or the microphone 16, for recognition as symbols, a 'behavior control program' for controlling the behavior of the robot apparatus 1, based on sensor inputs and on a preset behavior control model, as the program takes charge of the storage operations, such as short-term storage or long-term storage, as later explained, and a 'drive control program' for controlling the driving of respective joint motors or voice output from the loudspeaker 17, based on the behavior control program.

A non-volatile memory 24 is formed e.g. by an electrically erasable and rewritable memory device, such as an electrically erasable and programmable ROM (EEPROM), and is used for non-volatile storage of data which is to be updated sequentially. The data to be updated sequentially may be enumerated by cipher keys, other security information and device control programs to be installed after shipment.

An interface 25 is a device for interconnection with equipment outside the control unit 20 for enabling data exchange. The interface 25 effects data input/output with e.g. the camera 15, microphone 16 or the loudspeaker 17. The interface 25 also effects input/output of data or commands with the drivers $53_1$ to $53_n$ within the driving unit 50.

The interface 25 may also be provided with a general interface for connection to computer peripherals, such as a serial interface, e.g. RS (Recommended Standard)-232C, a parallel interface, e.g. IEEE (Institute of Electrical and Electronics Engineers) 1284, a USB (Universal Serial Bus) interface, an i-Link (IEEE 1394) interface, an SCSI (Small Computer System Interface) interface, or a memory card interface (card slot) holding therein a PC card or a Memory Stick, in order to transfer programs or data between the interface and the locally connected external equipment.

Another example of the interface 25 is an infrared communication (IrDA) interface for wireless communication with external equipment.

The control unit 20 also includes a wireless communication interface 26 and a network interface card (NIC) 27, and is able to communicate data with variable outside host computers via proximity wireless data communication, such as Bluetooth, a wireless network, such as IEEE.802.11b or a system-wide network, such as the Internet.

By this data communication between the robot apparatus 1 and the host computer, it is possible to calculate complicated motion control of the robot apparatus 1 or to remote-control the robot apparatus 1, using remote computer resources.

(2) Control System of Robot Apparatus

Figure 4:
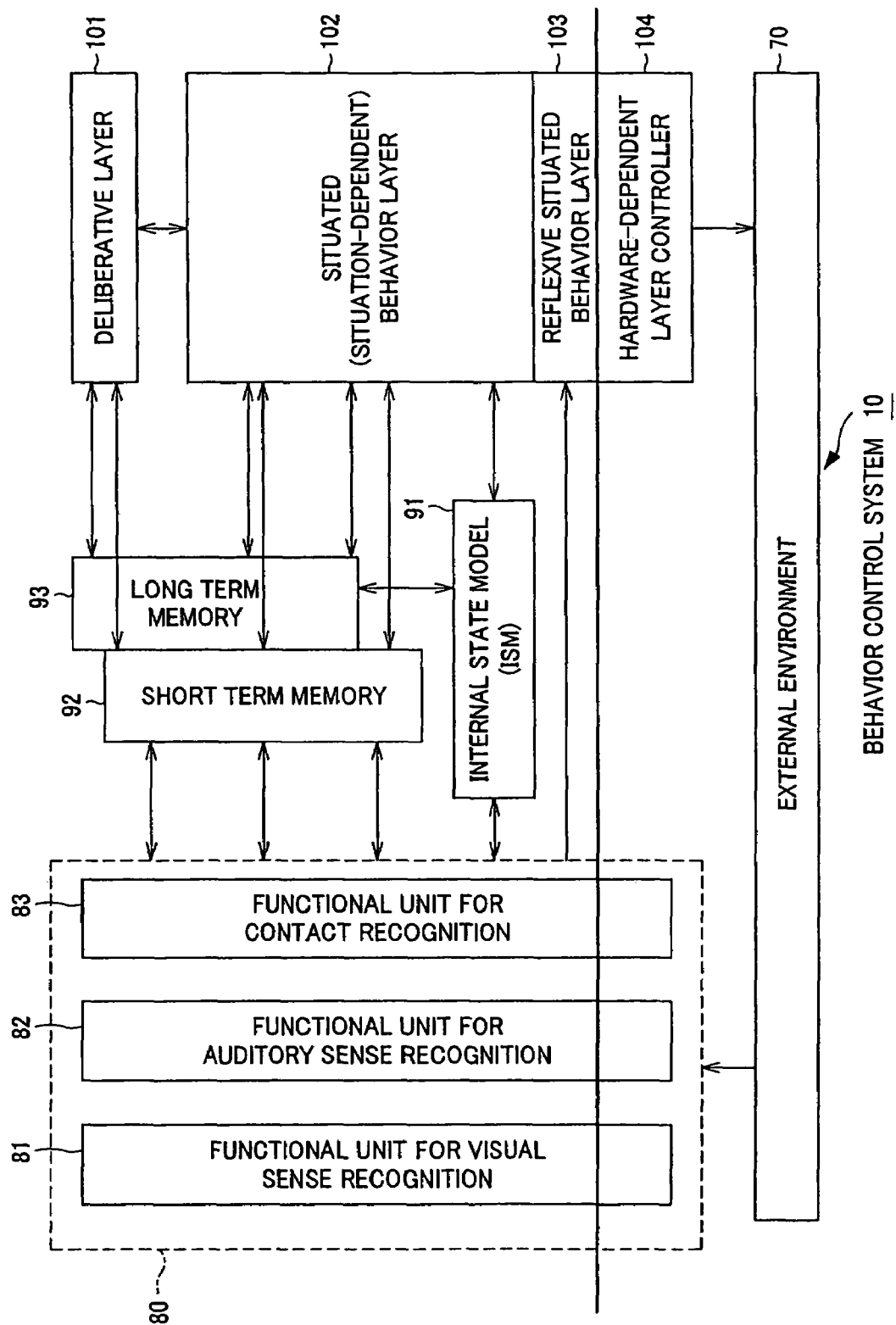
FIG. 4 is a schematic view showing the functional structure of a behavior control system 10 of the robot apparatus embodying the present invention.

The behavior (motion) control system of the robot apparatus is now explained. FIG. 4 schematically shows the functional structure of a behavior control system 10 of the robot apparatus 1 of the present embodiment. The robot apparatus 1 of the present embodiment is able to express the own state, responsive to the results of recognition of external stimuli or to changes in the inner state, to perform behavior control. The robot apparatus 1 also includes a long-term storage function and holds changes in the inner state from the external stimuli on memory by associative storage. Thus, the robot apparatus 1 is able to perform behavior control responsive to the results of recognition of the external stimuli or to the changes in the inner state and to express the results of recognition of the external stimuli or the changes in the inner state by expression means which will be explained subsequently.

The external stimuli herein mean the perceptual information obtained on recognition of the sensor inputs by the robot apparatus 1, for example, the color information, shape information or the face information, obtained on processing an input picture from e.g. the camera 15. More specifically, the external stimuli are made up by constituent elements, such as color, shape, face, general three-dimensional objects, hand gesture, motion, voice, contact, smell or taste.

The inner state is the modeled emotion, such as human instinct or human feeling, and means the emotion derived from the body unit of the robot apparatus. The elements of the instinct include, for example, at least one of the fatigue, fever or temperature, pain, hunger, thirst, affection, curiosity, elimination, and sexual appetite. The elements of the emotion include, for example, at least one of the happiness, sadness, anger, surprise, disgust, fear, frustration, boredom, somnolence, gregariousness, patience, tension, relaxedness, alertness, guilty feeling, spite, loyalty, submission and jealousy.

The object-oriented programming can be adopted and mounted on the behavior control system 10 illustrated in the drawings. In this case, each software item is handled with an 'object' as a unit. The 'object' is a module in which data is integrated to a procedure for processing the data. Each object is capable of exchanging and invoking data by an inter-object communication method employing the message communication and a co-owned memory.

For recognizing the external environment 70, including the outside status, the behavior control system 10 includes a status recognition unit 80, such as a video unit, that is, a functional unit for visual sense recognition 81, an audio unit, that is, a functional unit for auditory sense recognition 82, and a tactile unit, that is, a functional unit for contact recognition 83.

The functional unit for visual sense recognition 81 (video unit) performs picture recognition processing or feature extraction, such as face recognition or color recognition, based on an imaged picture entered via a picture inputting unit, such as a CCD (charge coupled device) camera.

The functional unit for auditory sense recognition 82 (audio unit) recognizes voice data, entered via a voice inputting device, such as microphone, as voice, and extracts the feature, or recognizes a word set (text).

The functional unit for contact recognition 83 (tactile unit) recognizes sensor signals by a contact sensor, enclosed in e.g. a head unit of the robot body, and thereby recognizes external stimuli, such as 'being stroked' or 'being patted'.

An internal state model (ISM) 91 supervises several sorts of the emotion, such as instinct or feeling, as modeled in the form of a mathematical equation, and supervises the inner state of the robot apparatus 1, such as instinct or emotion, responsive to the external stimuli as recognized by the functional unit for visual sense recognition 81, functional unit for auditory sense recognition 82 and the functional unit for contact recognition 83.

The feeling model and the instinct model (feeling/instinct model) are supplied with results of recognition and the hysteresis of the behavior, as inputs, to supervise the values of the feeling and the instinct. The behavioral model may refer to these values of the feeling and the instinct.

For performing behavior control responsive to the results of recognition of the external stimuli and to changes in the internal state, there are furthermore provided a short term memory 92 (STM) for holding on memory what is lost with lapse of time, on the short term basis, and a long term memory 93 (LTM) for holding the information on memory for a longer period of time. The classification of the memory mechanism into a short term memory and a long term memory is derived from neuropsychology.

The short term memory 92 is a functional module for holding on memory, for a short period of time, the targets or events recognized from the external environment by the functional unit for visual sense recognition 81, functional unit for auditory sense recognition 82 and the functional unit for contact recognition 83. For example, the short term memory holds on memory the input picture from the camera 15 shown in FIG. 2 for a short time of the order of 15 seconds.

The long term memory 93 is used for holding the information, obtained on learning, such as names of objects, for a longer period of time. For example, the long term memory 93 is able to hold on memory the changes in the inner state in a given behavior statement module, caused by the external stimuli, based on associative storage.

On the other hand, the behavior control of the present robot apparatus 1 is roughly classified into 'reflexive behavior' implemented by a reflexive situated behavior layer 103, a 'situated (situation-dependent) behavior', implemented by a situated behavior layer 102 (SBL), and a 'deliberative behavior' implemented by a deliberative layer 101.

The reflexive situated behavior layer 103 is a functional module for realizing reflexive motion of the robot body, responsive to the external stimuli as recognized by the functional unit for visual sense recognition 81, functional unit for auditory sense recognition 82 and the functional unit for contact recognition 83.

The reflexive behavior is basically such a behavior which directly receives the results of recognition of the external information, as entered from the sensors, and classifies these results to directly determine the output behavior. For example, the behavior of following the face of the human being and nodding may preferably be mounted as the reflexive behavior.

The situated (situation-dependent) behavior layer 102 controls the behavior of the robot apparatus 1 in meeting with the current state of the robot apparatus 1 based on the contents stored in the short term memory 92 and in the long term memory 93 and on the inner state supervised by the internal state model (ISM) 91.

The situated (situation-dependent) behavior layer 102 provides a state machine for each behavior and classifies the results of recognition of the external information, as entered to the sensors, in dependence upon the previous behavior or status, to realize the behavior on the robot body. The situated (situation-dependent) behavior layer 102 also realizes the behavior for maintaining the inner state within a preset range (also termed a 'homeostatic behavior'). If the inner state has surpassed a specified range, the behavior for resetting the inner state to the so specified range is activated to permit the behavior to be exhibited more readily. In actuality, the behavior is selected in such a manner that both the inner state and the outer state are taken into consideration. The situated (situation-dependent) behavior is retarded in the reaction time as compared to the reflexive behavior.

The deliberative layer 101 maps out a behavior schedule of a longer term for the robot apparatus 1, based on the contents of storage of the short term memory 92 and the long term memory 93.

The deliberate behavior means the behavior performed on the basis of an inference or a schedule for realization of the inference under a given status or a command from the human being. For example, searching a route from the current position and the target position of the robot apparatus 1 falls under the deliberate behavior. Since the inference and the schedule may be in need of longer processing time and heavier calculation loads than the reaction time and the calculation loads necessary for the robot apparatus 1 to maintain the interaction, the deliberate behavior executes the inference or the schedule as the above-described reflexive behavior or the situated (situation-dependent) behavior returns the reaction in real-time.

The deliberative layer 101, situated (situation-dependent) behavior layer 102 and the reflexive situated behavior layer 103 may be stated as being an upper application program not dependent on the hardware structure of the robot apparatus 1. On the other hand, a hardware-dependent layer controller 104 (configuration dependent action and reaction unit) is responsive to a command from these upper applications, that is, the behavior stating module (schema), to act directly on the hardware (external environment), such as by driving joint actuators. By this structure, the robot apparatus 1 is able to verify the own and surrounding statuses, based on the control program, to perform autonomous behaviors responsive to the commands and the actions from the user.

Figure 5:
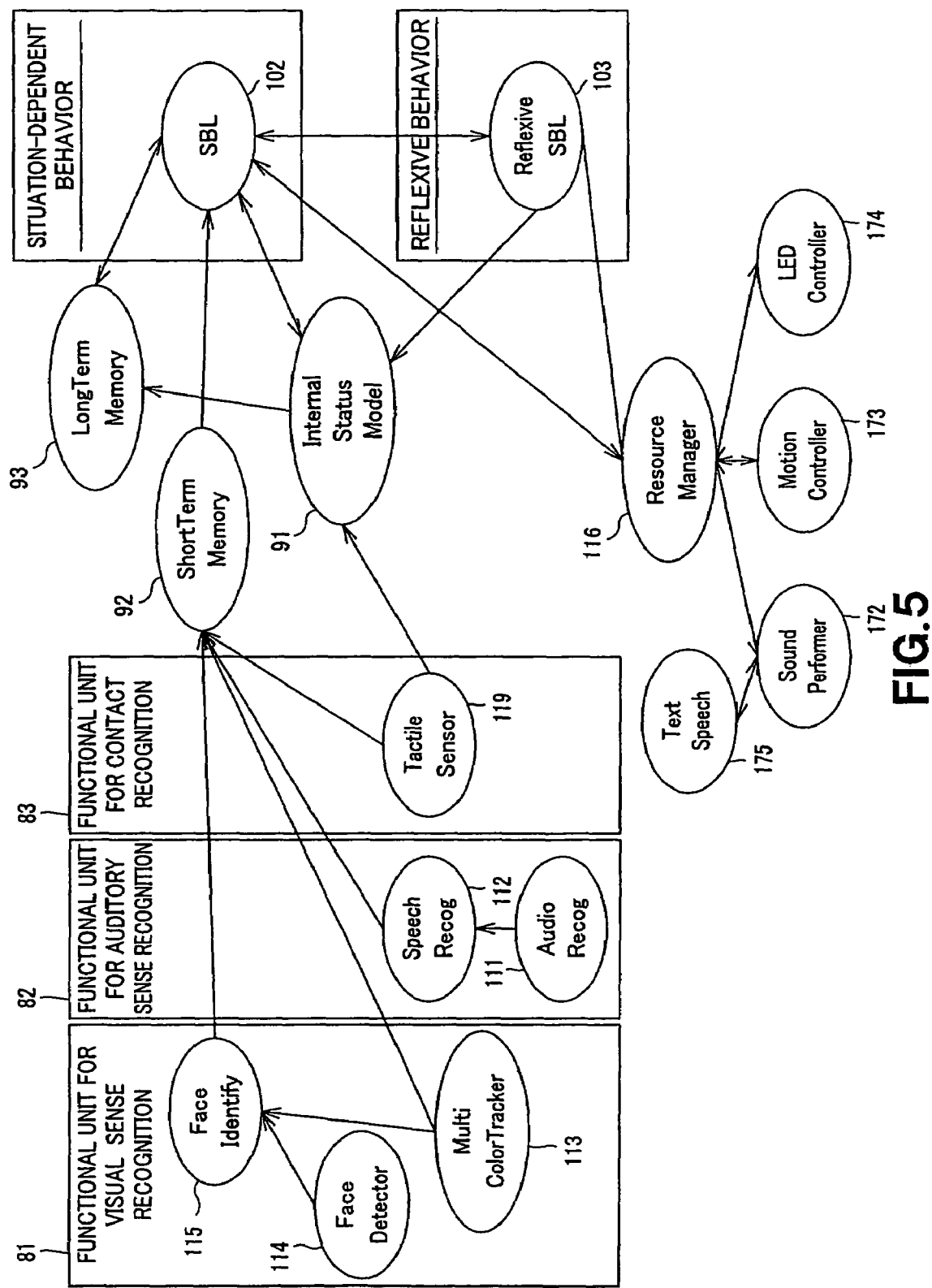
FIG. 5 is a schematic view showing an object structure of the behavior control system embodying the present invention.

The behavior control system 10 is now explained in further detail. FIG. 5 schematically shows an object structure of the behavior control system 10 of the present embodiment.

Referring to FIG. 5, the functional unit for visual sense recognition 81 is made up by three objects, namely a face detector 114, a multi-color tracker 113 and a face identifying unit 115.

The face detector 114 is an object for detecting a face area from a picture frame, and outputs the detected results to the face identifying unit 115. The multi-color tracker 113 is an object for color recognition and outputs the detected results to the face identifying unit 115 and to the short term memory (STM) 92. The face identifying unit 115 identifies a person e.g. by retrieving the detected face picture with a dictionary of names of persons available, and outputs the identification information of a person to the STM 92 along with the position and the size of the face picture area.

The functional unit for auditory sense recognition 82 is composed of two objects, namely an Audio Recog 111 and a Speech Recog 112. The Audio Recog 111 is an object for receiving voice data from a voice inputting device, such as a microphone, to extract features as well as to detect the voice domain. The Audio Recog 112 outputs feature quantities of the voice data of the voice domain and the sound source direction to the Speech Recog 112 and to the STM 92. The Speech Recog 112 is an object for recognizing the voice, using the voice feature quantity received from the Audio Recog 111, the voice dictionary and from the dictionary on sentence constructions, and outputs a recognized set of words to the STM 92.

The functional unit for contact recognition 83 (tactile unit) is composed of an object termed a tactile sensor 119 for recognizing the inputs from contact sensors, and outputs the results of recognition to the STM 92 and to the internal state model (ISM) 91 which is an object supervising the inner state.

The STM 92 is an object forming the short term storage unit and is a functional module for holding targets or events recognized from the external environment by the above-mentioned respective objects of the recognition system for a short period of time, such as holding e.g. an input picture from the camera 15 on memory for a short period of time of the order of 15 seconds, and notifies the SBL 102, as an STM client, of the external stimuli at stated intervals.

The LTM 93 is an object forming a long-term storage unit, and is used for holding the information, acquired on leaning, such as name of an article, for a long period of time. The LTM 93 is able to hold on memory the changes in the inner state from the external stimuli in e.g. a certain behavior statement module (schema) based on associative storage.

The ISM 91 is an object forming an inner state management unit and supervises the several sorts of the emotion, such as instinct or feeling, modeled by mathematical equations, and supervises the inner state of the robot apparatus 1, such as instinct or feeling, responsive to the external stimulus (ES) recognized by the respective objects of the above-described recognition system.

The SBL 102 is an object forming the situation-dependent behavior layer, and specifically is an object which is to become the client for the STM 92 (STM client). On receipt periodically of the notice on the information pertinent to the external stimuli (targets or events) from the STM 92, the SBL decides on the schema, that is, the behavior statement module to be executed, as will be explained in detail subsequently.

The reflexive SBL (situated behavior layer) 103 is an object forming a reflexive behavior unit, and executes reflexive direst motion of the robot body, responsive to the external stimuli as recognized by the respective objects of the above-described recognition system. For example, the robot apparatus performs an action of following the human face, nodding or instantly evading an obstacle detected.

The SBL 102 selects the situation-dependent motion responsive to the external stimuli or changes in the inner state. On the other hand, the reflexive SBL 103 selects the reflexive motion responsive to the external stimuli. The behavior selection by these two objects occurs independently of each other, so that, if the behavior statement modules (schemas) selected are carried out on the robot body, it may be an occurrence that hardware resources of the robot apparatus 1 are in competition and hence none of selected schemas can be realized. The object termed a resource manager 116 (RM) operates for arbitrating the competition among hardware resources at the time of behavior selection by the SBL 102 and the reflexive SBL 103. The robot body is actuated by notification to the respective objects which realize the motion of the robot body based on the results of arbitration.

A sound performer 172, a motion controller 173 and an LED controller 174 are objects for realizing the robot body motion. The sound performer 172 is an object for outputting the voice, and synthesizes the voice responsive to the text command imparted from the SBL 102 via the RML 116 to output the voice from a loudspeaker provided on the body unit of the robot apparatus 1. The motion controller 173 is an object for driving respective joint actuators on the robot body and, responsive to receipt of a command for causing motion of the hand or the leg from the SBL 102 via RM 116, calculates the relevant joint angles. The LED controller 174 is an object for controlling the color or the on/off operation of the LED light radiating device 19 and is responsive to receipt of the command from the SBL 102 via the RM 116 to perform the on/off operation of the LED light radiating device 19. It should be noted that the LED light radiating device 19 is able to represent plural reciprocally orthogonal states in parallel, such that the LED controller 174 controls the LED light radiating device 19 using plural expressive units of the LED light radiating device 19 capable of making plural orthogonal expressions.

(2-1) Situation-Dependent Behavior Control

Figure 6:
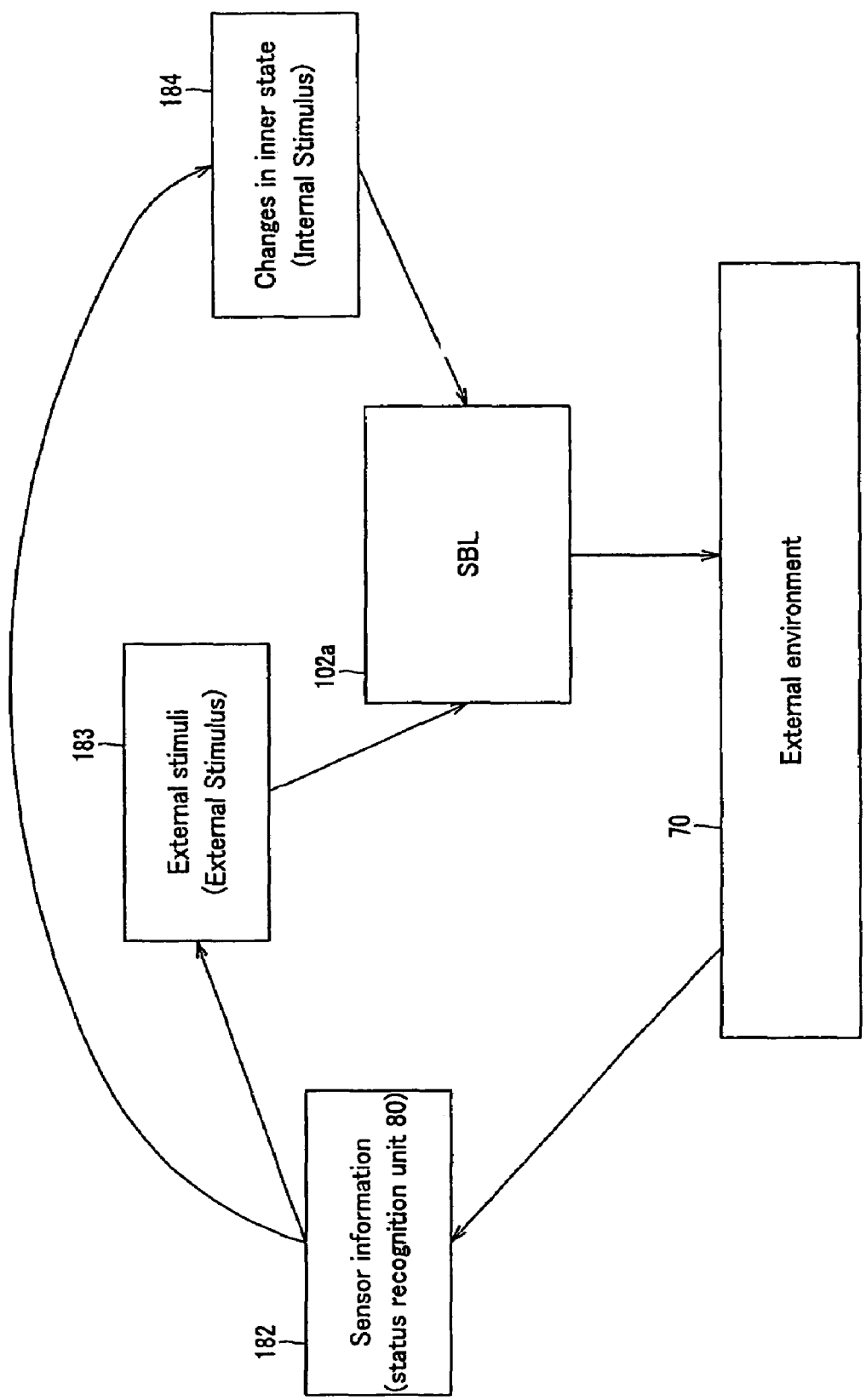
FIG. 6 is a schematic view showing the configuration of situation-dependent behavior control by a situation-dependent behavior layer embodying the present invention.

The situation-dependent behavior layers are now explained in further detail. FIG. 6 schematically shows the configuration of the situation-dependent behavior control by the situated behavior layer (SBL) inclusive of the reflexive control unit. The results of recognition (sensor information) 182 of the external environment 70 by the functional modules of the functional unit for visual sense recognition 81, functional unit for auditory sense recognition 82 and the functional unit for contact recognition 83 of the recognition system are imparted as external stimuli 183 to a situation-dependent behavior layer 102a inclusive of the reflexive SBL 103. The inner state or changes 184 in the inner state (inner stimuli) responsive to the results of recognition of the external environment 70 by the recognition system are also imparted to the situation-dependent behavior layer 102a. The situation-dependent behavior layer 102a verifies the situation, responsive to changes 184 in the inner state or the external stimuli 183, to achieve the behavior selection.

Figure 7:
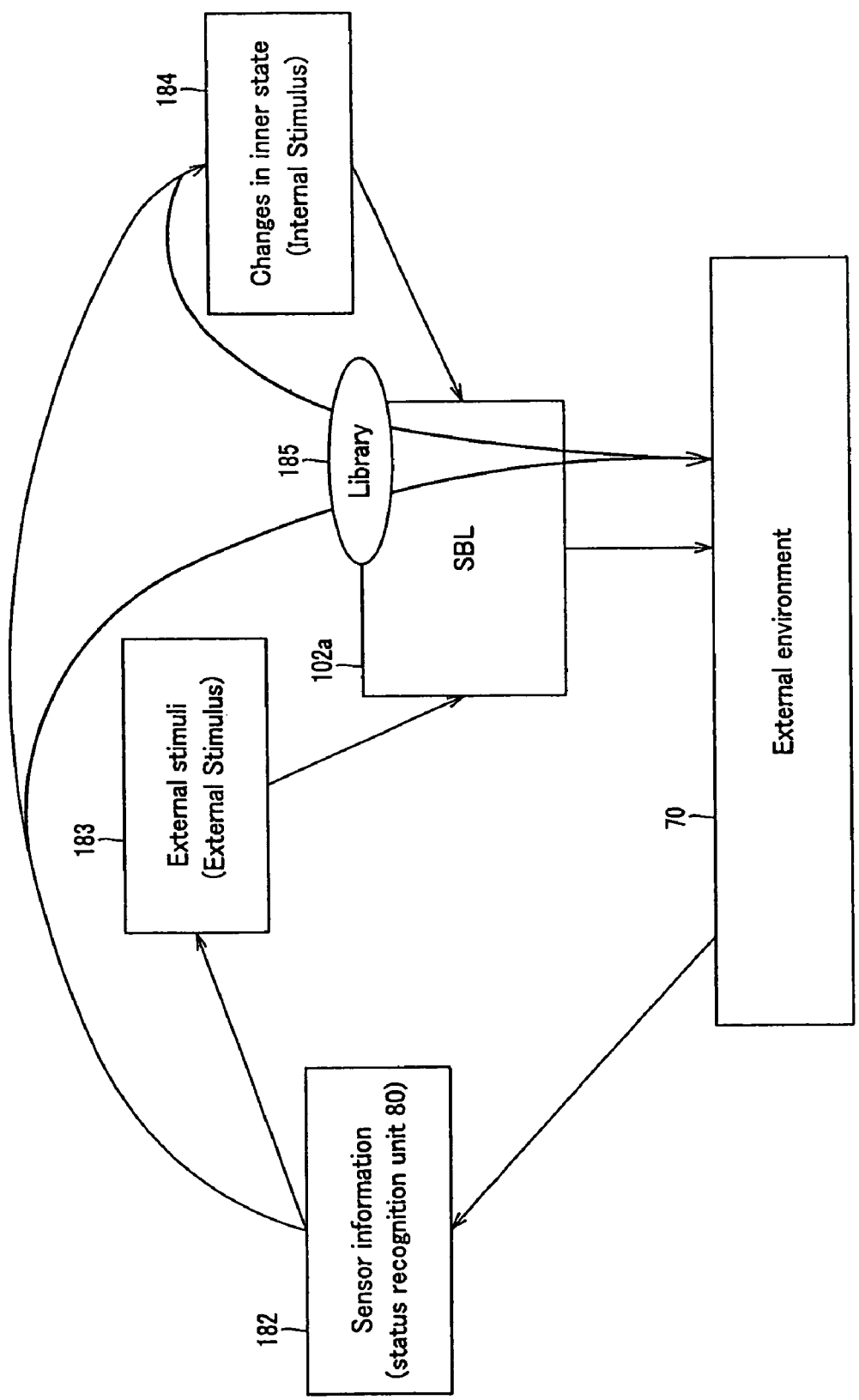
FIG. 7 is a schematic view showing a basic illustrative operation in behavior control by the situation-dependent behavior layer.

FIG. 7 shows the basic exemplary motion for behavior control by the situation-dependent behavior layer (SBL) 102a inclusive of the reflexive situated behavior layer 103 shown in FIG. 6. As shown in FIG. 7, the situation-dependent behavior layer 102a calculates the activation level of each behavior statement module (schema) by the external stimuli 183 or by the changes 184 in the inner state to select the schema in dependency upon the degree of the activation level to execute the behavior (motion). In calculating the activation level, unified calculation processing may be achieved for the totality of the schemas by exploiting e.g. a library 185. The same holds for the other schemas as well. For example, it is possible to select the schema having the highest activation level or to select two or more schemas, the activation levels of which have exceeded a preset threshold value, to execute the so selected schemas in parallel. In such parallel execution, it is a prerequisite that the respective schemas are not competing with each other for hardware resources.

Figure 8:
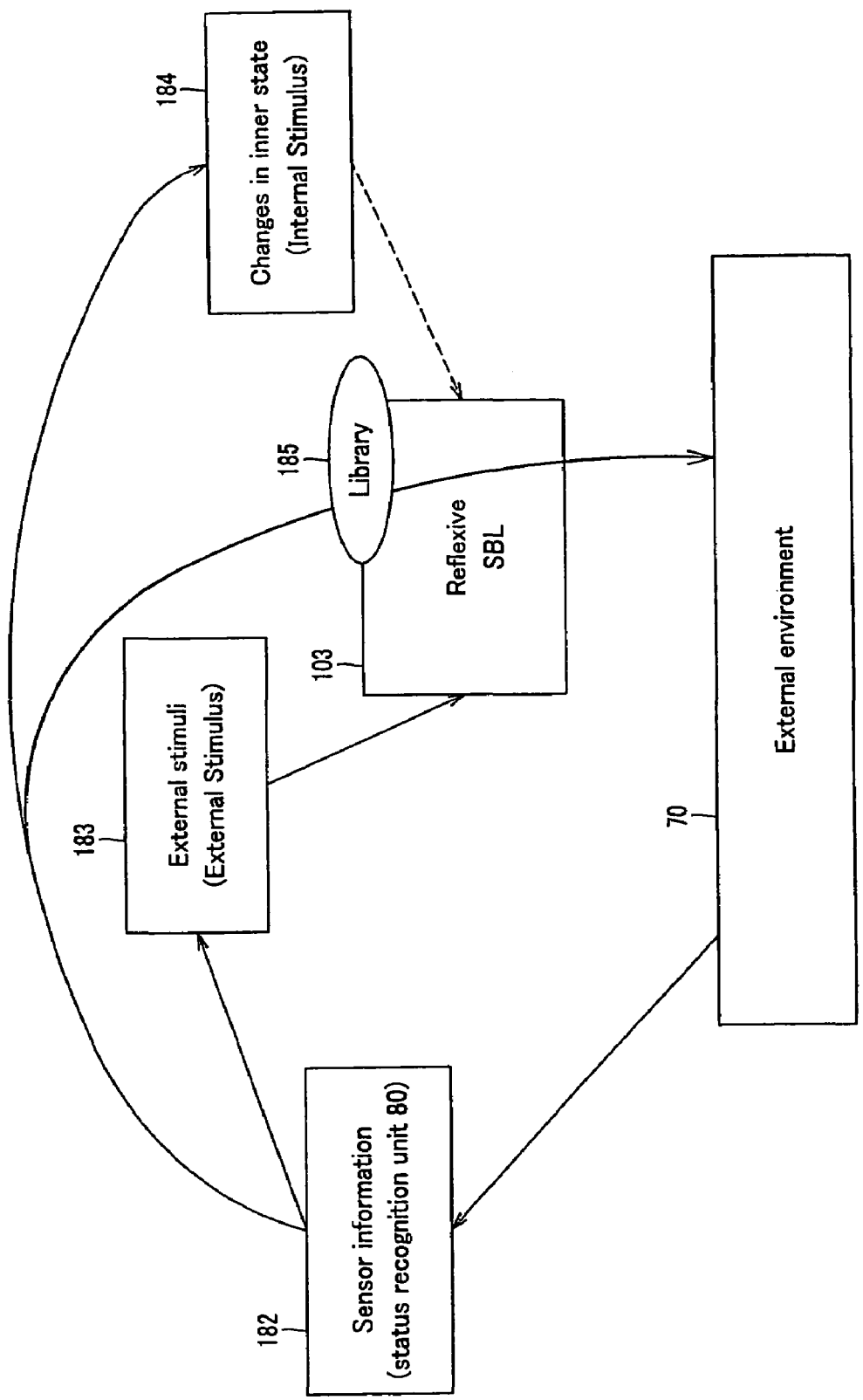
FIG. 8 is a schematic view showing a basic illustrative operation in case of performing the reflexive behavior by the situation-dependent behavior layer.

FIG. 8 shows exemplary motion in case a reflexive behavior is performed by the situation-dependent behavior layer 102a shown in FIG. 6. In this case, the reflexive situated behavior layer (reflexive SBL) 103 contained in the situation-dependent behavior layer 102a calculates the activation level, with the external stimuli 183, recognized by the respective objects of the recognition system, as direct input, and selects the schema to execute the behavior in dependency upon the degree of the activation level. In this case, the changes 184 in the inner state are not used in calculating the activation level.

Figure 9:
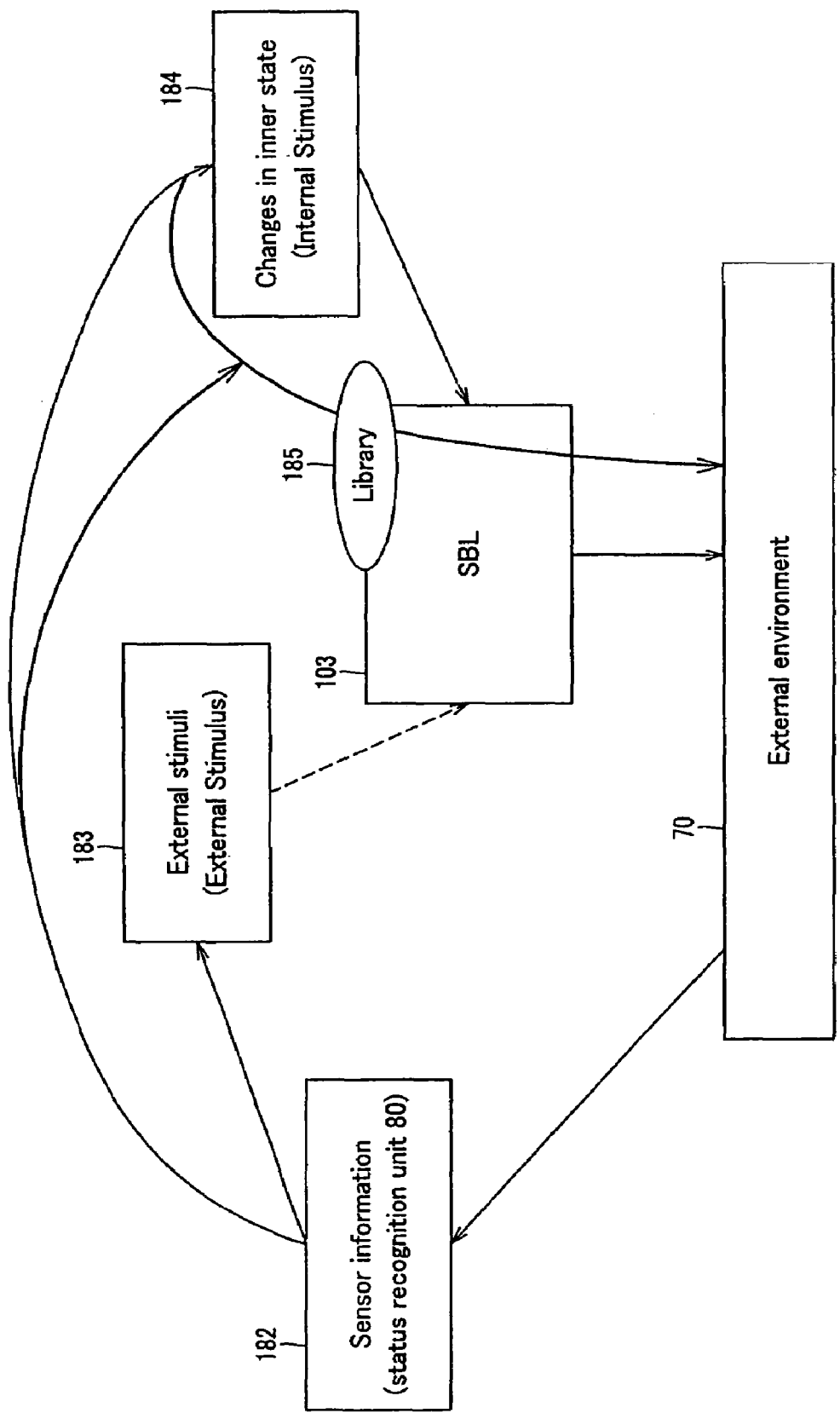
FIG. 9 is a schematic view showing a basic illustrative operation in case of performing the feeling expression by the situation-dependent behavior layer.

FIG. 9 shows exemplary motion in case of feeling expression by the situated (situation-dependent) behavior layer 102, shown in FIG. 6. The internal state model (ISM) 91 supervises the emotion, such as instinct or feeling, in the form of a mathematical equation model. The internal state model (ISM) 91 is responsive to the status value of the emotional parameters reaching a preset value to notify the situated (situation-dependent) behavior layer 102 of the changes 184 in the inner state. The situated (situation-dependent) behavior layer 102 calculates the activation level, with the changes 184 in the inner state as input, and selects the schema in dependency upon the degree of the activation level, in order to carry out the behavior. In this case, the external stimuli 183, recognized by the respective objects of the recognition system, are exploited for supervising and updating the inner state in the internal state model (ISM) 91, however, the external stimuli are not used for calculating the activation level for the schema.

(2-2) Schema

Figure 10:
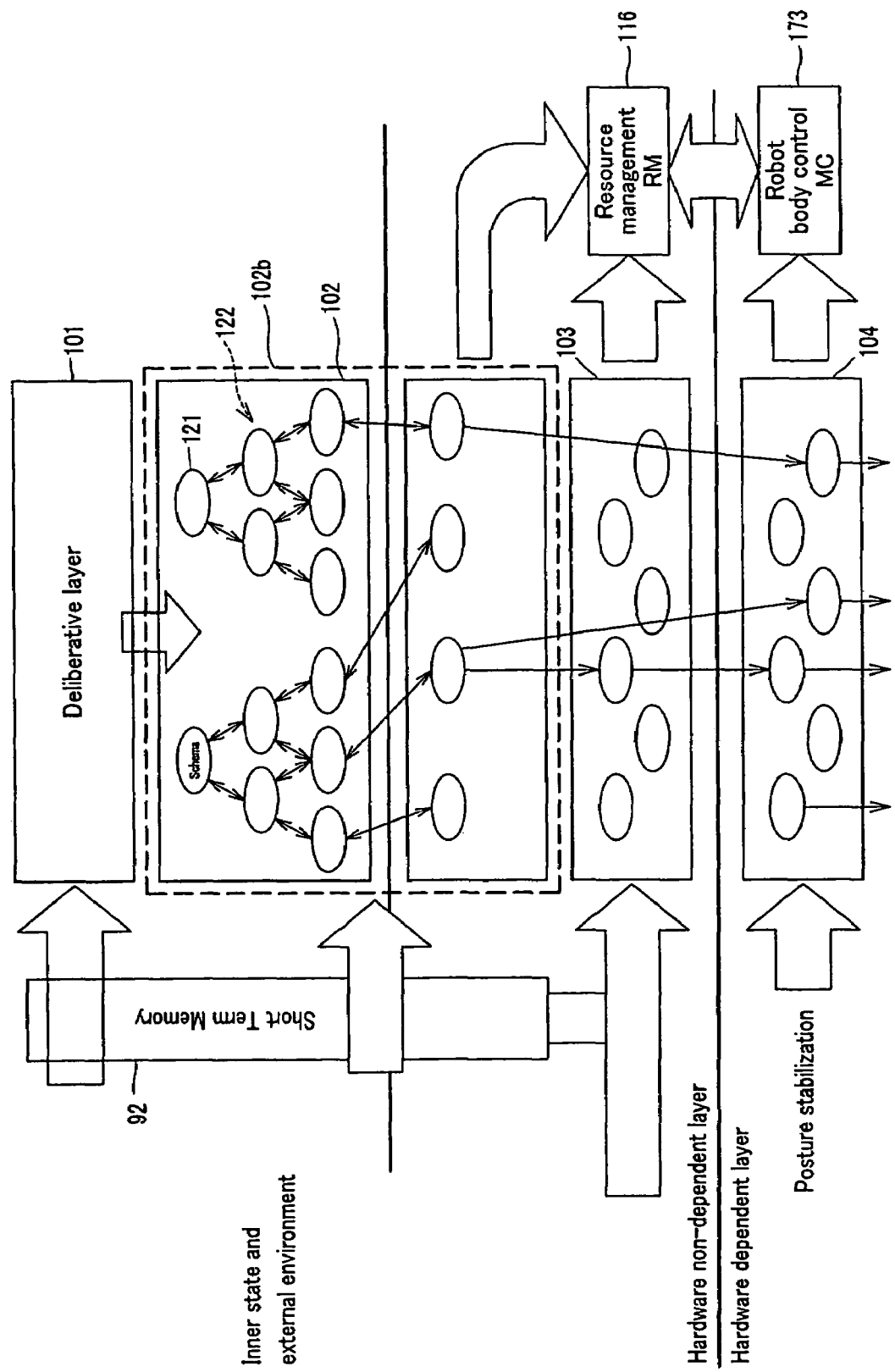
FIG. 10 is a schematic view showing the manner in which the situation-dependent behavior layer is made up by plural schemas.

FIG. 10 schematically shows how the situated (situation-dependent) behavior layer 102 is made up by plural schemas 121. The situated (situation-dependent) behavior layer 102 provides a state machine for each behavior statement module, that is, for each schema, and classifies the results of recognition of the external information, entered via sensors, in dependency upon the previous behaviors (motion) or situations, to exhibit the motion on the robot body. The schema is described as a schema 121 having a Monitor function for giving a decision on the situation in meeting with the external stimuli or the inner state and an Action function for realizing status transition attendant on the behavior execution (state machine).

A situated (situation-dependent) behavior layer 102b, more specifically, the layer of the situated (situation-dependent) behavior layer 102 controlling the ordinary situation-dependent behavior, is formed by a tree structure composed of hierarchically interconnected schemas 121, and is configured for comprehensively determining an optimum one of the schemas 121, in dependency upon the external stimuli and changes in the inner state, in order to perform the behavior control. The tree-structure is a tree 122 including e.g. a behavior model comprising e.g. ethological situation-dependent behaviors, arranged as mathematical equations, and plural sub-trees or branches, such as sub-trees for executing the feeling expressions.

Figure 11:
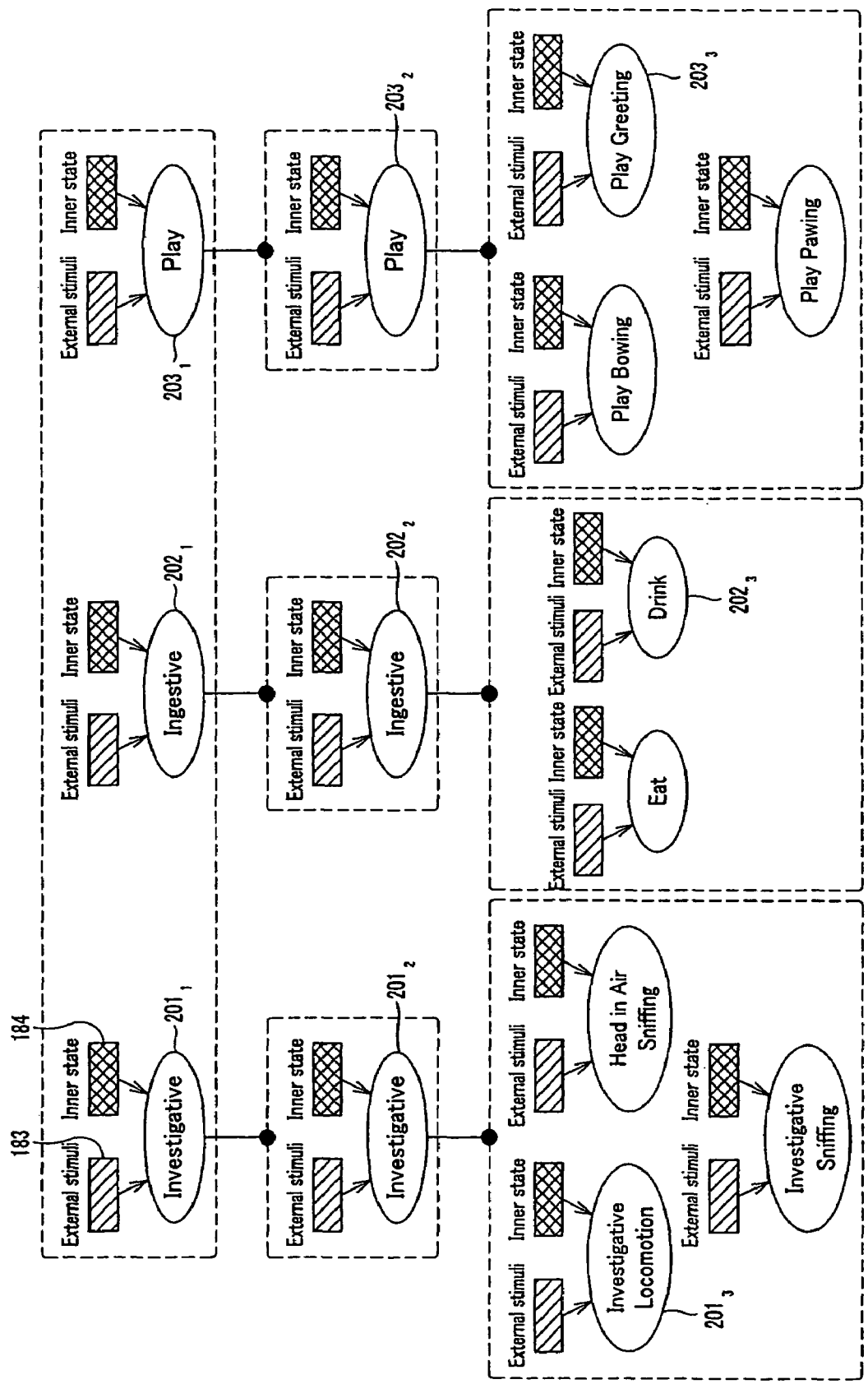
FIG. 11 is a schematic view showing a tree structure of the schemas in the situation-dependent behavior layer.

FIG. 11 schematically shows a schema tree structure in the situation-dependent behavior layer 102. This figure shows that schemas are arranged in each layer of the situation-dependent behavior layer 102, beginning from root schemas $201_1$, $202_1$, and $203_1$, notified of the external stimuli from the short term memory 92, in a direction from the abstract behavioral category to the concrete behavioral category. For example, in the layer directly subjacent to the root schemas, there are arranged schemas $201_2$, $202_2$ and $203_2$, termed 'investigate', 'ingestive' and 'play', respectively. In the layer subjacent to the schema $201_2$ 'investigate' there are arranged plural schemas $201_3$ stating more concrete investigative behaviors, namely 'investigative locomotion', 'head in air sniffing' and 'investigative sniffing'. In similar manner, in the layer subjacent to the schema $202_2$ 'investigate' there are arranged plural schemas $202_3$ stating more concrete ingestive behaviors, namely 'eat' and 'drink' and, in the layer subjacent to the schema $203_2$ 'play' there are arranged plural schemas $203_3$ stating more concrete play behaviors, namely 'play bowing', 'play greeting' and 'play pawing'.

As shown, each schema has the external stimuli 183 and the changes 184 in the inner state as inputs. Moreover, each schema at least has a Monitor function and an Action function.

The Monitor function is a function for calculating the Activation level (A) value of a schema in question responsive to the external stimuli and to the changes in the inner state. In constructing the tree structure shown in FIG. 11, the upper (parent) schema is able to invoke the monitor function of the lower (child) schema, with the external stimuli and the changes in the inner state as the argument, while the child schema returns the activation level. Additionally, a schema may invoke the Monitor function of a child schema in order to calculate the own activation level. Since the activation level from each sub-tree is returned to the root schema, it is possible to comprehensively determine an optimum schema, that is, an optimum behavior, in keeping with the external stimuli and changes in the inner state.

For example, it is possible to select the schema having the highest activation level or to select two or more schemas, the activation levels of which have exceeded a preset threshold value, to execute the so selected schemas in parallel. In such parallel execution, it is a prerequisite that the respective schemas are not competing for hardware resources.

The Action function also has a state machine stating the behavior owned by no other than the schema. In constructing the tree structure, shown in FIG. 11, the parent schema may invoke the Action function to cause the execution of the child schema to be started or discontinued. In the present embodiment, the state machine in the Action is not initialized unless it is Ready. In other words, the status is not reset even if the schema execution is discontinued, but the work data of the schema being executed is saved, so that re-execution on discontinuation is possible.

Figure 12:
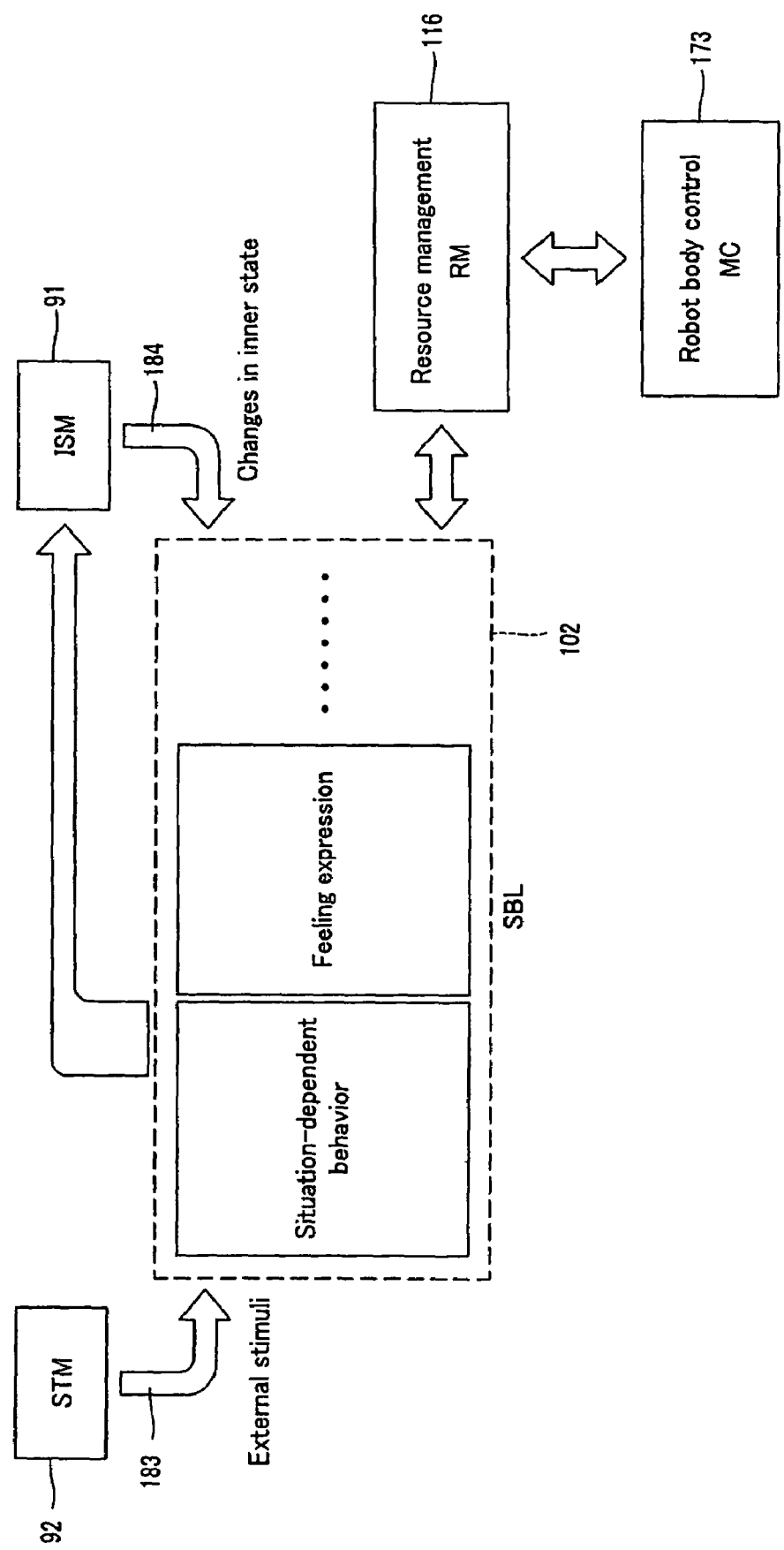
FIG. 12 is a schematic view showing a mechanism for controlling the ordinary situation-dependent behavior in the situation-dependent behavior layer.

FIG. 12 schematically shows the mechanism for controlling the usual situation-dependent behavior in the situation-dependent behavior layer 102.

In this figure, the situation-dependent behavior layer (SBL) 102 is supplied with (notified of) the external stimuli 183 from the short term memory 92, while being supplied with the changes 184 in the inner state from the internal state model (ISM) 91. The situation-dependent behavior layer 102 is formed by plural sub-trees including e.g. a behavior model comprising e.g. ethological situation-dependent behaviors, arranged as mathematical equations, and plural sub-trees for executing the feeling expressions. The root schema is responsive to the notice on the external stimuli 183 to invoke the Monitor function of each sub-tree and refers to the activation level (AL) value as a return value to make comprehensive behavior selection. The root schema also invokes the Action function for a sub-tee which realizes the selected behavior. The situation-dependent behavior, as determined in the situation-dependent behavior layer 102, is applied to the motion of the robot body (motion controller) after arbitration of the competition of the hardware resources with the reflexive behavior by the reflexive behavior unit 103 by the resource manager 116.

The reflexive behavior unit 103 in the situation-dependent behavior layer 102 is responsive to the external stimuli 183 recognized by each object of the above-described recognition system to execute a reflexive direct robot body motion to instantly avoid e.g. an obstacle detected. To this end, the present embodiment includes, in distinction from the case of controlling the ordinary situation-dependent behavior, shown in FIG. 11, a parallel non-hierarchical array of plural schemas 132, adapted for directly inputting signals from respective objects of the recognition system, as shown in FIG. 10.

Figure 13:
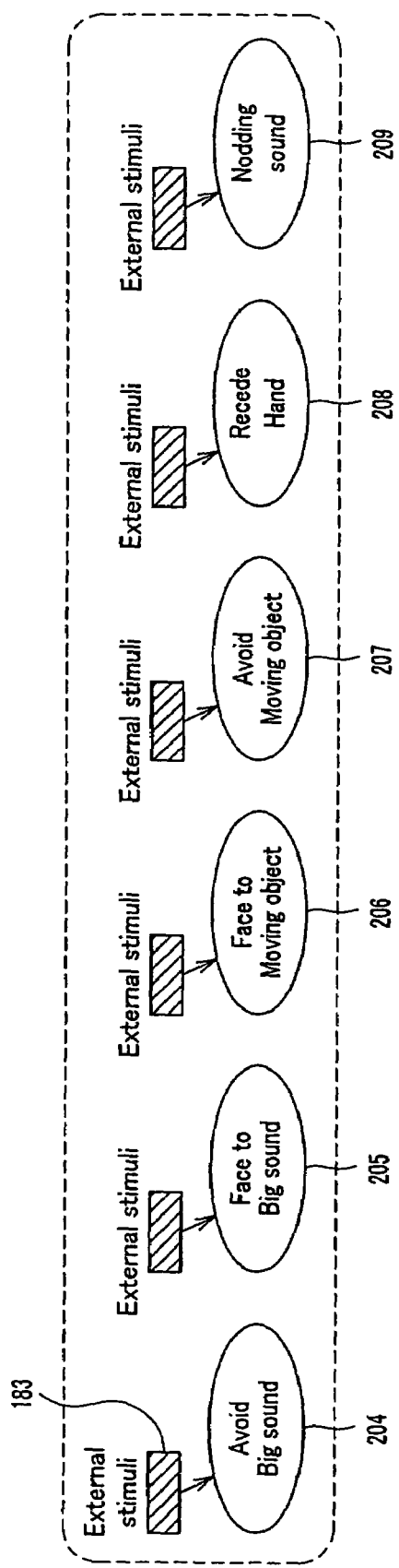
FIG. 13 is a schematic view showing the schema structure in a reflexive behavioral unit.

FIG. 13 schematically shows the schema structure in the reflexive behavior unit 103. In this figure, there are arranged in parallel, in the reflexive behavior unit 103, an Avoid Big Sound 204, a Face to Big Sound 205, a Nodding Sound 209, as schemas run responsive to the results of recognition of the auditory system, a Face to Moving object 206, and an Avoid Moving Object 207, as schemas operated responsive to the results of recognition of the visual sense, and a Recede hand 208, as a schema operating responsive to the results of recognition of the tactile system. These schemas are arranged in parallel, that is, as equal schemas.

As shown, the schemas performing the reflexive behaviors include the external stimuli 183 as inputs. Each schema also has at least a Monitor function and an Action function. The Monitor function is responsive to the external stimuli 183 to calculate the activation level of a schema in question and accordingly checks to see whether or not the corresponding reflexive behavior is to be demonstrated. The Action function also includes a state machine stating the reflexive behavior owned by no other than the schema. On revocation, the relevant reflexive behavior is exhibited, while the state of the Action undergoes transitions.

Figure 14:
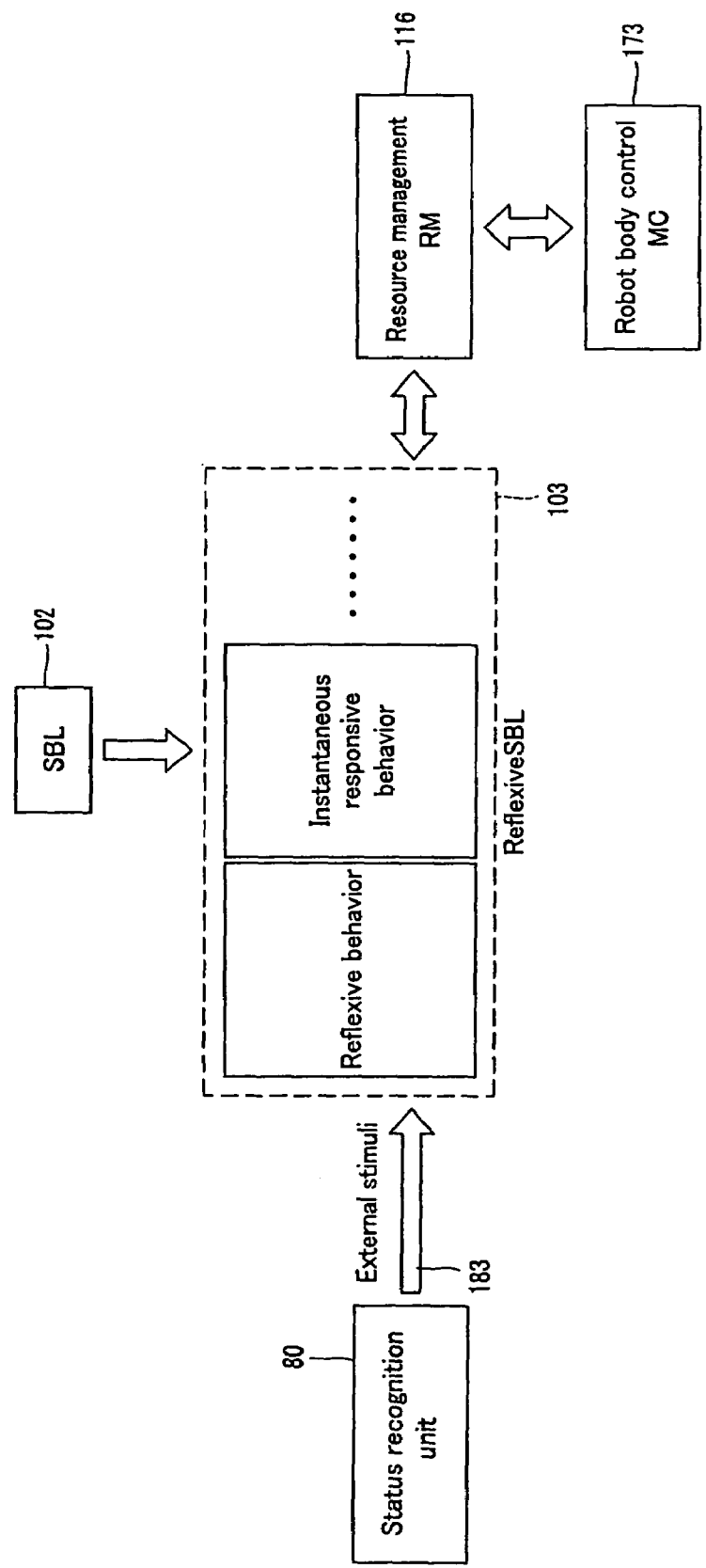
FIG. 14 is a schematic view showing a mechanism for controlling the reflexive behavior by the reflexive behavioral unit.

FIG. 14 schematically shows the mechanism for controlling the reflexive behavior in the reflexive situated behavior layer 103. As also shown in FIG. 13, there are arranged in the reflexive SBL 103, in parallel, a schema stating the reactive behavior and a schema stating the instant response behavior. When the results of recognition are entered from the respective objects forming the status recognition unit 80, the corresponding reflexive behavior schema calculates the activation level by the monitor function and, responsive to the so calculated level, determines whether or not the Action should be booted. The reflexive behavior, determined to be booted in the reflexive SBL 103, is put to the motion of the robot body (motion controller 173) subject to advance arbitration by the resource manager RM 116 as to competition of hardware resources with the situation-dependent behavior with the situation-dependent behavior layer 102.

Figure 15:
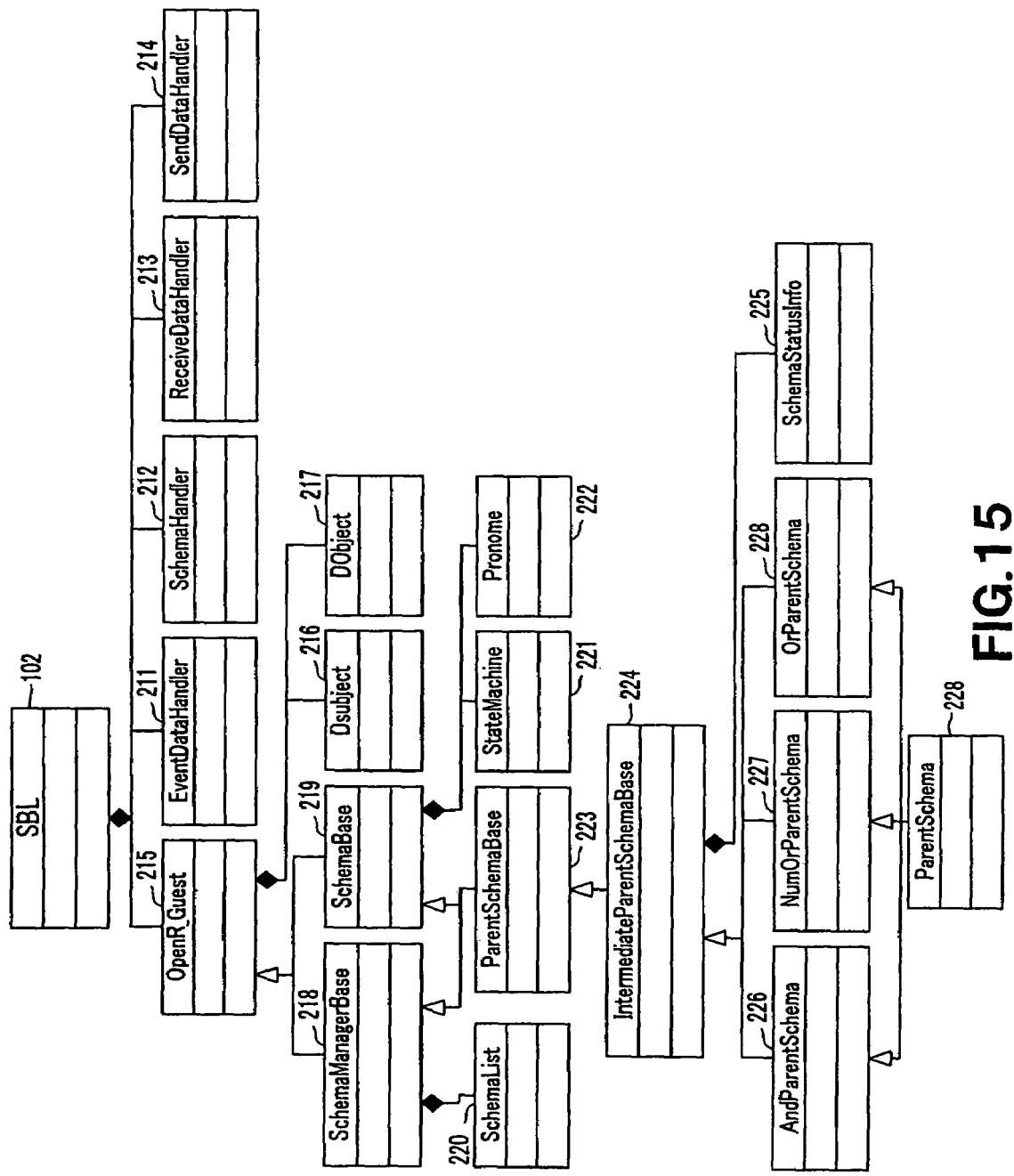
FIG. 15 is a schematic view showing the class definition of the schemas used in the situation-dependent behavior layer.

The schemas forming the situation-dependent behavior layer 102 and the reflexive situated behavior layer 103 may be stated as 'class objects' stated in e.g. the C++ language basis. FIG. 15 schematically shows the class definition of the schemas used in the situation-dependent behavior layer 102. Each block shown in this figure is equivalent to a class object.

As illustrated, the situation-dependent behavior layer (SBL) 102 is made up by one or more schemas, an Event Data Handler (EDH) 211 allocating an ID to each input/output event of the SBL 102, a Schema Handler (SH) 212 supervising the schemas in the SBL 102, one or more Receive Data handlers (RDH) 213 receiving data from external objects (such as objects of the STM, LTM, resource manager and the recognition system) and one or more Send Data Handler (SDH) 214 for transmitting data to external objects.

The Schema Handler 212 keeps, as a file, the information on the schemas making up the situation-dependent behavior layer (SBL) 102, reflexive situated behavior layer 103 and the tree structure (information on the SBL configuration). For example, on booting the system, the Schema Handler 212 reads-in the file of the configuration information to construct (re-generate) the schema structure of the situation-dependent behavior layer 102, shown in FIG. 11, to map the entities of the respective schemas on the memory space.

Each schema includes an OpenR-Guest 215, positioned as a basis for the schema. The OpenR-Guest 215 includes one or more DSubjects 216, as class object, in order for the schema to send data to outside, ands one or more DObjects 217, again as class objects, in order for the schema to receive data from outside. For example, in case the schema sends data to the external objects of the SBL 102, such as the respective objects of STM, LTM or the recognition system, the DSubject 216 writes transmission data in the Send Data Handler 214. The DObject 217, on the other hand, is able to read out data, received from the external object of the SBL 102, from the Receive Data handlers 213.

A Schema Manager 218 and a Schema Base 219 are class objects which extend the OpenR-Guest 215. The class extension means extending the definition of the original class. In the present case, the Schema Manager Base 218 and the Schema Base 219 also own the class objects, such as DSubject 216 or DObject 217, defined in the OpenR-Guest 215. The same applies for other schemas as well. For example, if plural schemas make up a tree structure, as shown in FIG. 11, the Schema Manager Base 218 includes a class object Schema List 220, supervising the list of child schemas, and may invoke the function of the child schemas. The Schema Base 219 also has a pointer to the parent schema and may return a return value of the function invoked by the parent schema.

The Schema Base 219 has two class objects, namely a State Machine 221 and a Pronome 222. The State Machine 221 supervises a state machine pertinent to the behavior of the schema in question (Action function). A parent schema is able to switch (cause state transition of) the state machine of the Action function of the child schema. Into the Pronome 222 is substituted a target for the schema in question to execute or apply the behavior (Action function). The schema is occupied by the target substituted into the Pronome 222, as will be explained subsequently, such that the schema is not freed until the behavior (motion) has come to a close, such as by completion or termination on occurrence of an abnormality. In order to execute the same behavior for a new target, a schema of the same class definition is generated in the memory space. The result is that the same schema may be executed independently from target to target, without the work data of the respective schemas conflicting with one another, thus assuring reenterability of the behavior as later explained.

A Parent Schema Base 223 is a class object extending the Schema Manager 218 and the Schema Base 219 by multiple extensions, and supervises a parent schema and a child schema, that is, a parent-child relation, as to no other than the schema in question, in the tree structure of the schemas.

An Intermediate Parent Schema Base 224 is a class object extending the Parent Schema Base 223, and realizes the interface conversion for the respective classes. The Intermediate Parent Schema Base 224 also has a Schema Status Info 225. This Schema Status Info 225 is a class object supervising the state machine of no other than the Schema in question. A parent schema may invoke the Action function of a child Schema to switch the status of the state machine. The parent schema may also invoke the Monitor function of the child Schema to inquire into the activation level in keeping with the status of the state machine. It should be noted however that the state machine of a schema differs from the state machine of the above-described Action function.

An And Parent Schema 226, a Num Or Parent Schema 227 and an Or Parent Schema 228 are class objects extending the Intermediate Parent Schema Base 224. The And Parent Schema 226 has pointers to plural child schemas executed simultaneously. The Or Parent Schema 228 has pointers to plural child schemas executed alternatively. Additionally, the Num Or Parent Schema 227 has pointers to plural child schemas only a preset number of which are executed simultaneously.

The Or Parent Schema 228 is a class object extending the And Parent Schema 226, a Num Or Parent Schema 227 and an Or Parent Schema 228 by multiple extensions.

Figure 16:
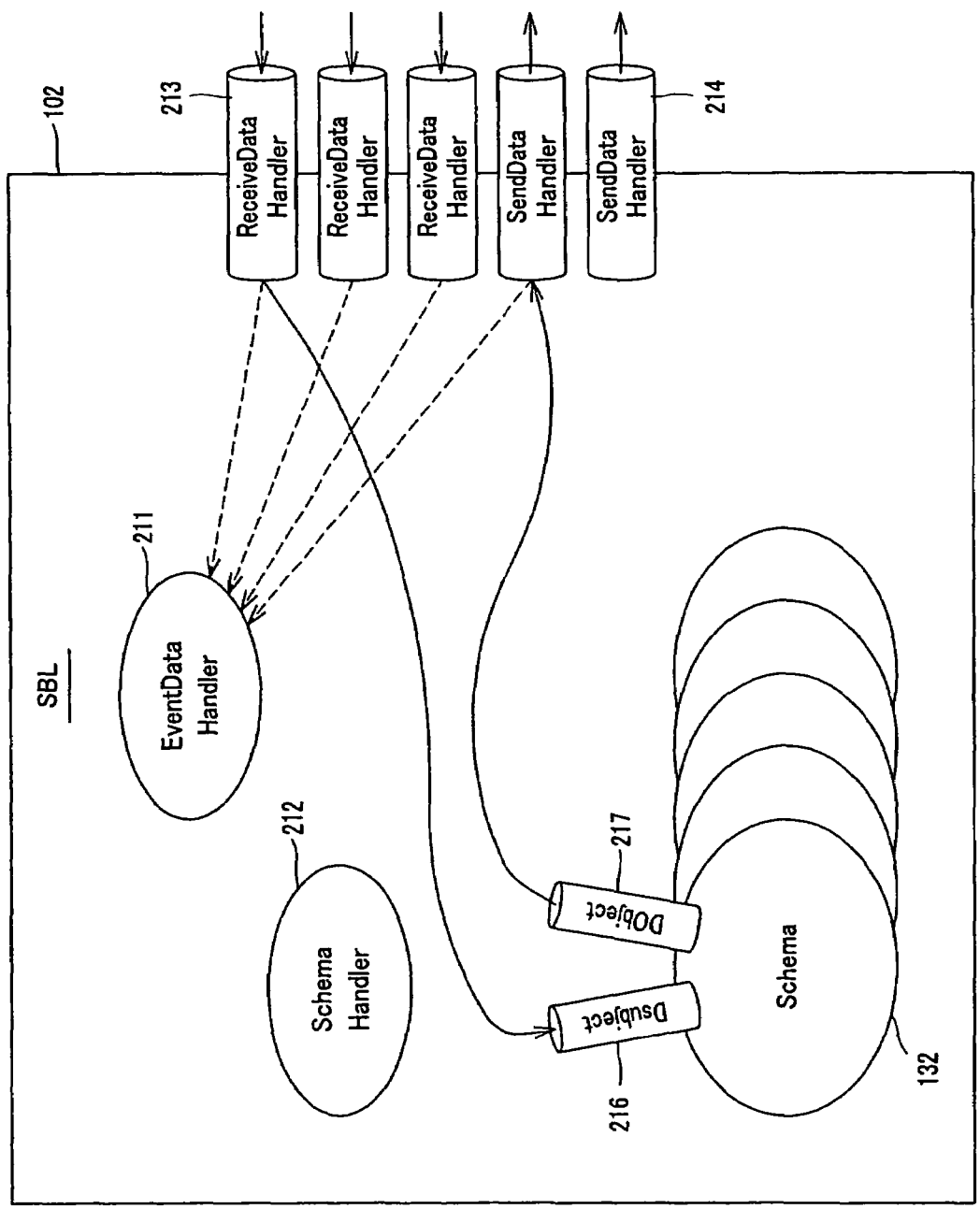
FIG. 16 is a schematic view showing the functional structure of a class within the situation-dependent behavior layer.

FIG. 16 schematically shows the functional structure of the classes in the situation-dependent behavior layer (SBL) 102. This situation-dependent behavior layer (SBL) 102 includes one or more Receive Data handlers (RDH) 213 for receiving data from external objects, such as objects of STM, LTM, the resource manager or the recognition systems, and one or more Send Data Handler (SDH) 214 for transmitting data to the external objects, The Event Data Handler (EDH) 211 is a class object for allocating the IDs to input/output events of the SBL 102, and is notified of the input/output event from the RDH 213 or the SDH 214.

The Schema Handler (SH) 212 is a class object for supervising the schema 132 and keeps the configuration information of the schemas forming the SBL 102 as a file. For example, on system startup, the Schema Handler (SH) 212 reads-in this configuration file to construct the schema structure in the SBL 102.

Each schema is generated in accordance with the class definition shown in FIG. 15 and has the entity mapped in the memory space. Each schema has the OpenR-Guest 215 as the base class object and includes the class objects, such as the DSubject 216 or the DObject 217, for data accessing to outside.

The functions and the state machines, mainly owned by the schema 132, are indicated below. The functions, indicated below, are stated in the Schema Base 219. ActivationMonitor(): Evaluation function for the schema to become Active during Ready time
Actions(): State machine for execution during Active time
Goal(): Function for evaluating whether or not the schema has reached the Goal during Active time
Fail(): Function for evaluating whether or not the schema is in a state of failure during Active time
SleepActions(): State machine executed before Sleep
SleepMonitor(): Evaluation function for resuming during Sleep time
ResumeActions(): State machine for resuming before resuming
DestroyMonitor(): Evaluation function for verifying whether or not the schema is in a state of failure during Sleep time
MakePronome(): Function for determining the target of the entire trees.

(2-3) Function of the Situation-Dependent Behavior Layer

The situation-dependent behavior layer (SBL) 102 controls the motion matched to the current situation for the robot apparatus 1, based on the stored contents of the short term memory 92 and the long term memory 93 and on the inner state supervised by the internal state model (ISM) 91.

As discussed previously, the situation-dependent behavior layer 102 in the present embodiment is constructed by a tree structure (see FIG. 11) of the schema. Each schema maintains its dependency as it is aware of the information of the own parent and children. By this schema structure, the situation-dependent behavior layer 102 has main features of concurrent evaluation, concurrent execution, preemption and reenterability. These features will now be explained in detail.

(2-3-1) Concurrent Evaluation

The schema as the behavior statement module has a function as a Monitor for giving a decision on the situation matched to the external stimuli or to changes in the inner state, as explained previously. The Monitor function is mounted by the schema having the Monitor function in the class object Schema Base. The Monitor function is the function of calculating the activation level responsive to the external stimuli or to changes in the inner state.

In constructing the tree structure, shown in FIG. 11, the upper (parent) schema is able to invoke the monitor function of the lower (child) schema, with the external stimuli and the changes in the inner state as the argument, while the child schema returns the activation level. Additionally, a schema may invoke the monitor function of a child schema in order to calculate the own activation level. Since the activation level from each sub-tree is returned to the root schemas $201_1$ to $203_1$, it is possible to comprehensively determine an optimum schema, that is, an optimum motion, in keeping with the external stimuli and changes in the inner state.

On account of this tree structure, the evaluation of each schema by changes in the external stimuli or in the inner state is performed concurrently, first from a lower part to an upper part of the tree structure. That is, in case a schema has a child schema, the schema in question first invokes the Monitor function of the selected child and subsequently executes the own Monitor function. The permission for execution, as the results of the evaluation, is then delivered from the upper part towards the lower part of the tree structure. The evaluation and execution are carried out as the hardware resources used for the motion are freed from the state of competition.

The situation-dependent behavior layer 102 in the present embodiment is compatible with such situation as the external stimuli or changes in the inner state, because the behavior evaluation may be achieved in parallel by taking advantage of the schema's tree structure. During the evaluation time, the entire tree structure may be evaluated, and the tree structure is changed in dependency upon the activation level (AL) values calculated, so that precedence may dynamically be taken of a schema, that is a motion to be executed, over other schemas.

(2-3-2) Concurrent Execution

Since the activation level is returned from each sub-tree to the root schema, an optimum schema, that is, optimum motion, may comprehensively be determined in meeting with the external stimuli or with the changes in the inner state. For example, it is possible to select the schema having the highest activation level or to select two or more schemas, the activation levels of which have exceeded a preset threshold value, to execute the so selected schemas in parallel. In such parallel execution, it is a prerequisite that the respective schemas are not competing with each other for hardware resources.

The schema which has received the permission for execution is executed. That is, in actuality, the schema observes the external stimuli or the changes in the inner state in further detail to execute the command. The command is executed sequentially, that is, concurrently, from an upper part towards a lower part of the tree structure. That is, if a given schema has a child schema, the Action function of the child is carried out.

The Action function includes a state machine stating the behavior (motion) owned by no other than the schema. In case the tree structure shown in FIG. 11 is constructed, the parent schema invokes the Action function to start or interrupt the execution of the child schema.

In case the hardware resources are not in a competing state, the situation-dependent behavior layer (SBL) 102 in the present embodiment is able to execute the other schemas, employing redundant hardware resources, by exploiting the schema's tree structure. However, the inconsistent behavior may be produced except in case limitations are imposed on the hardware resources used up to the goal. The situation-dependent behavior, as determined by the situation-dependent behavior layer (SBL) 102, is applied by the resource manager to the motion of the robot body (motion controller) through the arbitration of the competition of the hardware resources with the reflexive behavior by the reflexive behavior unit (reflexive BL) 103.

(2-3-3) Preemption

Even if a schema has once been executed, but there is any behavior more critical (that is, with a higher precedence) than the executed schema, the schema needs to be discontinued to transfer the right for execution to the more critical schema. It is also necessary to re-start the former schema to continue its execution when the more critical behavior has come to a close (completion or interruption).

Such task execution in keeping with the priority is analogous with the function termed the Preemption in the operating system (OS) in the field of computers. In the OS, the guideline is that tasks are executed in the falling order of priority with the timing which takes the schedule into consideration.

Conversely, with the control system 10 of the present embodiment of the robot apparatus 1, in which plural objects are encompassed, arbitration between these objects is required. For example, the reflexive SBL 103, as an object controlling the upper reflexive behavior, has to avoid an obstacle or keep the balance without being bothered by the behavior evaluation by the situated (situation-dependent) behavior layer 102 as an upper object controlling the situation-dependent behavior. In effect, the reflexive SBL acquires an initiative in behavior execution to execute the behavior. In this case, the reflexive SBL notifies the upper behavior statement module (SBL) that the upper object has now been deprived of the initiative. The upper object performs the processing to keep the preemptive capability.

It is now assumed that, as a result of the evaluation of the activation level, which is based on the external stimuli and changes in the inner state in the situated (situation-dependent) behavior layer 102, a given schema is given the permission to execute a behavior. It is also assumed that, by the evaluation of the activation level, which is based on subsequent external stimuli and changes in the inner state, another schema has become higher in criticality. In such case, the Sleep state may be set by exploiting the Actions function of the schema being executed, and the schema being executed is discontinued, by way of preemptive behavior switching.

The status of the Action() of the schema being executed is kept and the Actions () of the new schema are executed. After the end of the Action() of the new schema, the Action() of the schema, once discontinued, may be re-executed.

Before discontinuing the Actions() of the schema being executed, and transfer of the initiative for execution to the new schema, the SleepActions() is executed. For example, on finding a soccer ball during the dialog, the robot apparatus 1 may say 'just wait a moment' to play soccer.

(2-3-4) Reenterability:

Each schema forming the situated (situation-dependent) behavior layer 102 is a sort of the subroutine. If invoked from plural parents, a schema needs to own a storage space allocated to the respective parents, for storing the inner states of each of plural parents, in order to hold the inner states of the plural parents on memory.

This is analogous with the reenterability proper to the OS. In the present specification, this is termed the reenterability for the schemas. The schema 132 is formed by class objects, as shown in FIG. 16, and reenterability is achieved by generating the entity, that is, the instance, of the class object, from one target (pronome) to another.

Figure 17:
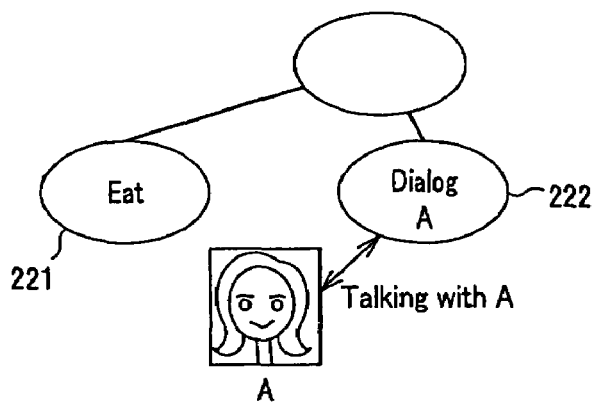
FIG. 17 illustrates reenterability of the schema.
Figure 17:
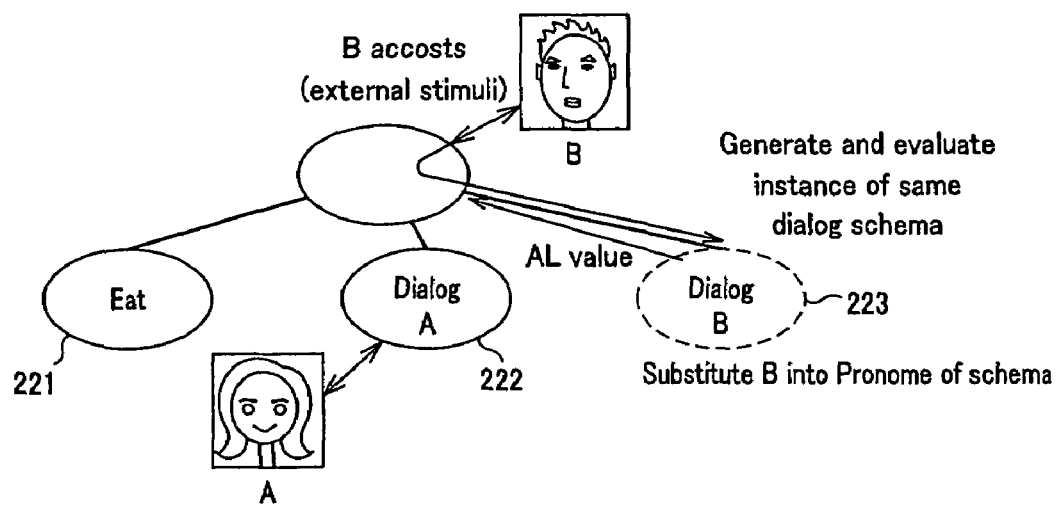
Figure 17:
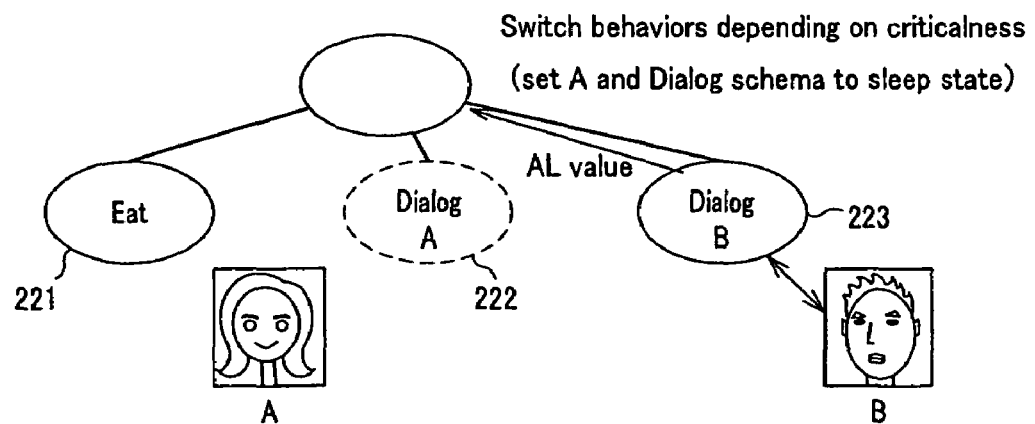

Referring to FIG. 17, the schema reenterability is explained in more detail. The Schema Handler (SH) 212 is a class object for supervising the schemas and keeps the configuration information of the schemas forming the SBL 102 as a file. On booting the system, the Schema Handler (SH) 212 reads-in this configuration information file to construct the schema structure in the SBL 102. In the embodiment shown in FIG. 17, it is seen that the entities of the schemas prescribing the behavior (motion) of Eat 221 or Dialog 222 have been mapped on the memory space.

It is now assumed that, by the evaluation of the activation level, which is based on the external stimuli and the changes in the inner state, the target A (pronome) is set for the schema Dialog 222, and that the schema Dialog 222 has come to execute the dialog with the person A.

It is also assumed that a person B has interposed in the dialog between the robot apparatus 1 and the person A and, as a result of subsequent evaluation of the activation level which is based on the external stimuli and the changes in the inner state, a schema 223 for having a dialog with the person B has become higher in priority.

In such case, the Schema Handler (SH) 212 maps another Dialog entity (instance), which extends the class for having the dialog with B, on the memory space. Since the dialog with B is carried out using the other Dialog entity, independently of the previous Dialog entity, the contents of the dialog with A are not destroyed. Thus, the data consistency of the Dialog A may be maintained and, on completion of the dialog with B, the dialog with A may be re-initiated as from the time point of the previous interruption.

The evaluation, that is, the calculations of the activation level, of the schema in the Ready list, is performed in dependency upon the schema's subject (external stimuli), and the initiative for execution is transferred. The instance of the schema, moved into the Ready list, is then generated, and evaluation is made of the remaining subject. In this manner, the same schema may be set to the Active or Sleep state.

(3) First Embodiment

The method for expressing the statuses, such as the status of feeling or the status of the results of perceptual recognition, convenient for the first embodiment of the robot apparatus 1, constructed as described above, is now explained. The present first embodiment of the robot apparatus includes light radiating devices, such as LED indicators (eye lamps), as expression means capable of parallel representation of the own orthogonal states, as described above.

The light radiating devices in the present embodiment are made up by, for example, LEDs and LED controllers, controlling the LEDs. The color hue, intensity, saturation and light emitting patterns (changes in intensity), having variably set light radiating time duration and period, are controlled by the LED controller.

That is, the light radiating devices are provided with plural expressive units (abilities of expression), capable of plural orthogonal expressions, independent from one another, on the time axis, such as color hue, intensity and saturation of light emission. The plural statuses of the robot apparatus are allocated to these expressive units and thereby expressed by a number of the light radiating devices which is equal to or smaller than the number of the status types. Moreover, plural contents of expression (statuses of the robot) are made to co-exist simultaneously in the light radiating device as sole expression means.

In particular, if, among the statuses, expressed by the robot apparatus, orthogonal states with different attributes, that are not unnatural when present together, such as the inner states, e.g. the feeling and instinct, and the states of visual recognition, which are based on the results of visual recognition, such as are obtained with cameras, are allocated to plural expressive units of the expression means, capable of orthogonal expressions, it is possible to demonstrate more humane multifarious states. Moreover, the parameters of the expressive units, allocated to the respective states, are variably controlled by the expressive elements owned by the respective states. The expressive elements, owned by the respective statuses, denote the sorts and the strength of the emotional states or the subject to be recognized of the states of recognition.

(3-1) Light Radiating Device

First, the LED light radiating device, as an example of the expression means, expressing these states of the robot apparatus, is explained in detail.

Figure 18A:
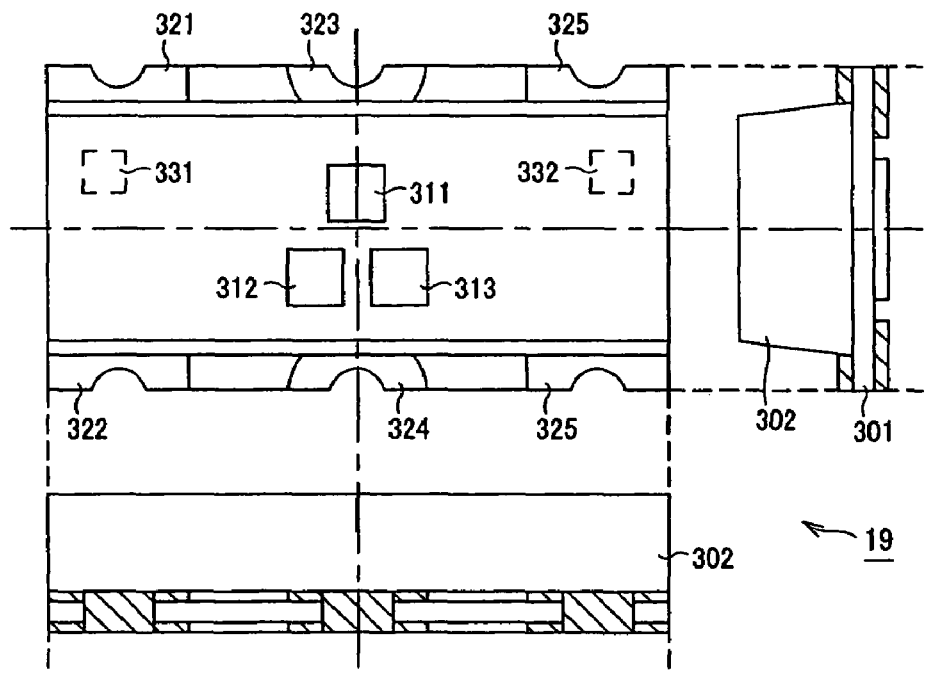
FIGS. 18A, 18B show exemplary expression means of the robot apparatus according to the first embodiment of the present invention, where
Figure 18B:
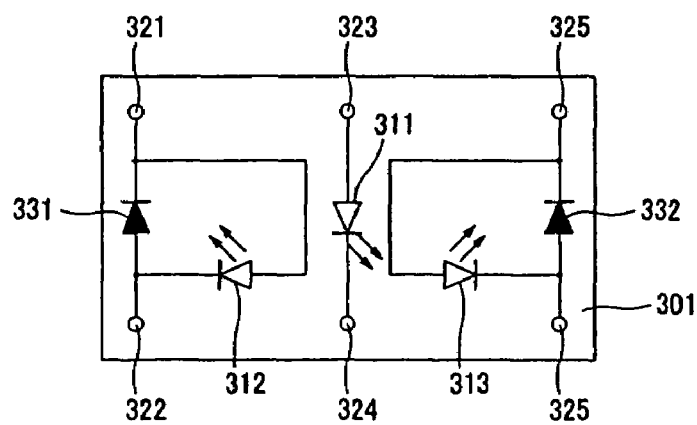

FIG. 18A shows, in a plan view and a side view, an LED light radiating device 19 shown in FIG. 2. FIG. 18B shows a circuit diagram showing the inner circuit of the LED light radiating device 19. As the LED light radiating device 19, a device shown for example in FIG. 18A may be used. Referring to FIG. 18A, the LED light radiating device 19 includes a substrate 301, LEDs 311 to 313, provided on the substrate 301 for indicating orange, green and blue, respectively, anti-static diodes 331, 332 for prohibiting static destruction of the LEDs 311 to 313, and six electrodes 321 to 326 provided on the lower surface of the substrate 301 and connected to the anodes and the cathodes of the LEDs 311 to 313. The LEDs 311 to 313 and the anti-static diodes 331, 332 on the substrate 301 are encapsulated by e.g. transparent or milk-white resin 302.

The LED 311, emitting the orange color, is formed e.g. of AlGaInP, while the LED 312, emitting the green color, is formed e.g. of GaN and the LED 313, emitting the blue color, is formed e.g. of GaN.

Referring to FIG. 18B, the LEDs 311 to 313, mounted on the substrate 301 of the LED light radiating device, are connected to an anode electrode 323 and a cathode electrode 324, to an anode electrode 321 and a cathode electrode 322 and to an anode electrode 325 and a cathode electrode 326, respectively. The reverse-biased anti-static diodes 331, 332 are connected across the anode electrode 321 and the cathode electrode 322 and across the anode electrode 325 and the cathode electrode 326, respectively, to prevent static destruction.

The LED light radiating device, constructed as described above, are provided with tri-color LEDs 311 to 313, arranged in proximity to one another, and thereby are capable of emitting light in full color fashion, such that it is possible to control the color hue, saturation and intensity independently of one another on the time axis, by way of performing orthogonal expressions. Moreover, the pattern of light radiation indicating the light radiating time duration and the period of light radiation (on/off pattern) of the LEDs 311 to 313 may be controlled independently of the color hue, saturation and intensity. The LED light radiating device 19 is connected to the LED controller, controlling the LED light radiating device 19, so as to be controlled in color hue, saturation, intensity and in the light radiation patterns. The LED controller is controlled by a signal generated on the basis of the external stimuli and changes in the inner state in a CPU 21 of the control unit 20.

Figure 19:
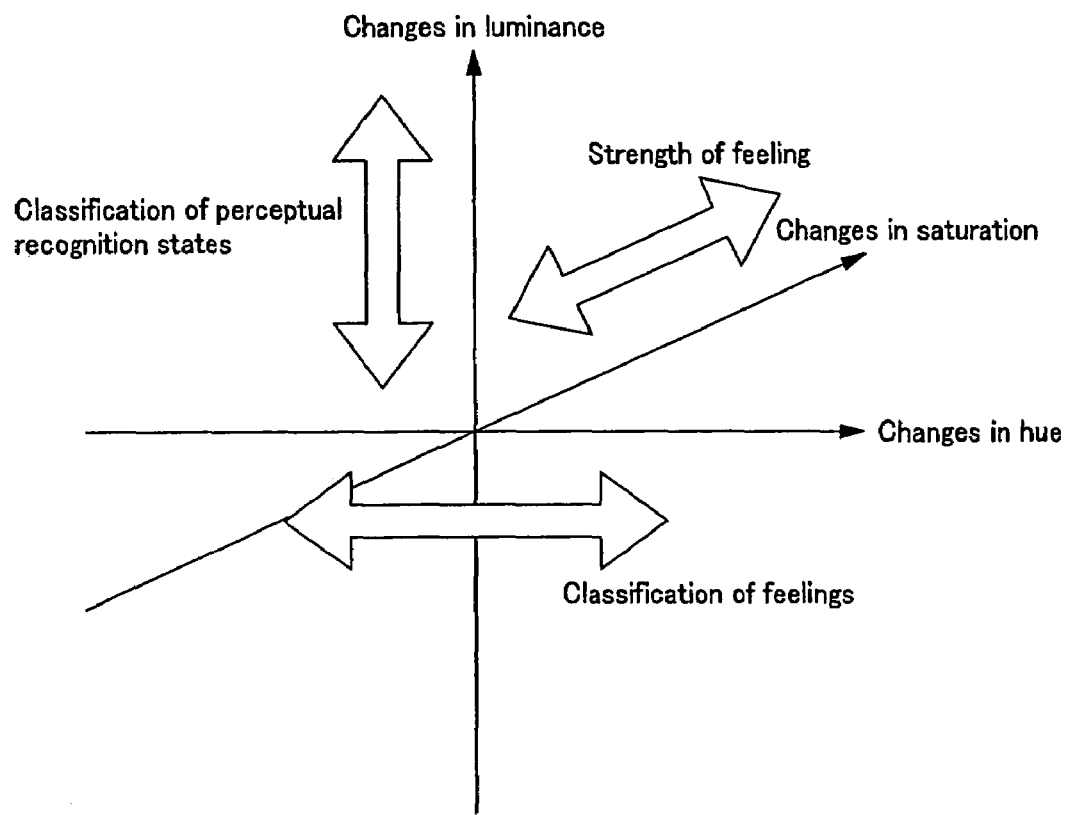
FIG. 19 is a schematic view showing orthogonal representation in a light radiating device which is means for expressions of a robot apparatus according to a first embodiment of the present invention.

FIG. 19 schematically shows the orthogonal expressions in the light radiating device. In FIG. 19, the color hue, saturation and patterns of light emission, as expressive units, representing respective independent orthogonal expressions on the time axis, are associated with feeling classes, feeling intensity and states of perceptual recognitions, which are respective independent states. In addition, the expressive elements of the respective states may be expressed in association with changes in the color hue, in the saturation and in the light emission pattern (changes in luminance).

For example, the expressive elements owned by the emotional states, such as 'happiness', 'sadness', 'anger', 'disgust' and 'fear', may be classed by parameter-controlling the values of the color hues to give such colors as 'green', 'light blue', 'red', 'orange' and 'blue', respectively. Additionally, the strengths, as expressive elements of these respective feelings, may be represented by varying the saturation, such that, if extremely strong 'happiness' is to be demonstrated, bright green obtained by raising the saturation may be used, whereas, if weak 'happiness' is to be demonstrated, dark green obtained by lowering the saturation may be used. On occurrence of an event of visual recognition, such as finding or discrimination of a face or finding of a ball, a landmark or an electrical charging station, the time duration of light radiation may be varied depending on the article found to express the state of visual recognition in agreement with the article found. In the present specification, the expressions according to the classes of the emotional state, those according to the strength of the emotional state and those according to the articles found are stated as representing the expressive elements of the respective states.

As expressions of other states (expressive elements), the feeling of 'surprise' may be expressed by e.g. random discrete changes in the color hue, while the virtual somnolent state may be expressed e.g. by steadily lowering the saturation or the intensity.

Moreover, by loading the LED light radiating device 19 around two CCD cameras, loaded as eyes on the head unit 3, the own state of the robot apparatus may be visually transmitted to the human being, thus assuring more abundant user interactions and improved entertainment characteristics of the robot apparatus.

In the present LED light radiating device 19, the expressive elements thereof, that is, the color hue, saturation, intensity and the light radiation patterns, may be adjusted as continuous values, temporally independently of one another, so that, when the robot apparatus itself is autonomously giving a decision on the behavior, plural orthogonal statuses can be expressed in parallel simultaneously by associating the expressive units with the inner state or the state of visual recognition of the robot apparatus. Moreover, by combining these expressive units, variegated expressions may be provided by even a sole light radiating device. By efficiently exploiting the expressive capability of the expressing means, it becomes unnecessary to provide a number of the light radiating devices which is the same as the number of the states. A plural number of the LED light radiating devices may be provided as necessary.

(3-2) Method for Expressing the Robot Apparatus

The method for expressing the robot apparatus, employing the above-described LED light radiating device, is now explained in further detail. The calculating processing process, pertinent to the control algorithm for the light radiating device of the present robot apparatus, may roughly be divided into four, namely a status recognition unit 80, a feeling/instinct model 90, a behavior decision unit 100 and a behavior generating unit 110.

The status recognition unit 80 is made up e.g. of the aforementioned functional unit for visual sense recognition 81, functional unit for auditory sense recognition 82 and the functional unit for contact recognition 83, and plays the role of being supplied with the information of sensors loaded on the body unit of the robot apparatus to transmit the information to the feeling/instinct model 90.

The feeling/instinct model 90 calculates inner state parameters, representing the robot's own feeling and desire, in accordance with the information supplied from the status recognition unit 80.

The behavior decision unit 100 determines the behavior in the situated (situation-dependent) behavior layer 102, contained along with the deliberative layer 101 and the reflexive situated behavior layer 103 in the behavior decision unit, and has plural behavior unit modules (schemas), in which each unit encompassing a wide range from a unit having an abstract meaning, such as dancing, to a unit having a concrete meaning, such as outputting a motion command instructing a motion of the robot body, e.g. a rotational angle of the actuator, has independent meanings and functions. The behavior decision unit 100 determines the schema, that is, the behavior, to be demonstrated, from these schemas. The behavior decision unit 100 calculates the value indicating the relative intensity of desirability of carrying out the modules (priority of execution of the schemas) as activation level, in dependency upon the inner state parameters as obtained from the feeling/instinct model 90, and determines which schema is to be executed, responsive to this activation level. In this manner, it is autonomously determined, responsive to the external stimuli and the changes in the inner state, which behavior is to be actually performed. The selected schema operates as means for issuing a control command for outputting a command for controlling the light radiating device, as expression means, in order to demonstrate the expressions matched to the own behavior. The behavior decision unit 100 may be provided with a separate schema for expressing the status matched to the input information from the status recognition unit 80 or the feeling/instinct model 90 for outputting a control command based on the input information.

The behavior generating unit 110 operates as control means for controlling the light radiating device and receives a command output from the behavior decision unit 100 to convert the command into an actual hardware output. Each processing unit will now be explained in further detail.

(3-2-1) Feeling/Instinct Model

The feeling/instinct model 90 turns the results of visual recognition from the CCD camera, results of recognition of the voice from the microphone, the residual battery capacity, the input information from plural sensors for comprehending the physical state in the inside and the outside of the robot body, such as contact sensors, temperature sensors for measuring the temperature in various sites of the robot body, or joint angle sensors for detecting changes in the joint angle, the hysteresis information of the communication, as obtained from the conversational interactions with the user, or the volume of the stored information, into a model, as indicating the own inner state, for calculations as the inner state parameters (feeling value and instinct value). That is, the information from the status recognition unit is configured to affect the inner state parameters in the feeling/instinct model 90, such that changes in the residual battery capacity affects the 'glutted' feeling as the inner state parameter and a sufficient charged state is determined to be the emotional state with a higher degree of satisfaction thus more readily producing the emotional state of 'happiness'. On the other hand, if there is a marked difference between the command value of the joint angle and the actual joint angle, and the difference is produced instantaneously, the 'pain' as the inner state parameter is affected, whereas, if the difference is ed over a long time period, the 'fatigue' as the inner state parameter is affected. If these inner state parameters 'pain' or 'fatigue' are increased, it is highly likely that these parameters are changed to more negative emotional states, such as sadness or anger. Moreover, the inner parameters are changed, based on the behavior decided on in the behavior decision unit 100 which will be explained subsequently. For example, when the behavior of the schema as selected in the behavior decision unit 100 is demonstrated and finished, certain inner state parameters, such as 'fatigue' or 'satisfaction', are affected by e.g. the residual battery capacity or power consumption before and after the behavior demonstration.

In the feeling/instinct model 90 of the present embodiment, six feelings, namely 'happiness', 'sadness', 'anger', 'surprise', 'disgust' and 'fear' are modeled. Additionally, lower inner states, comprising 'pain', 'comfort', 'glutted feeling', 'somnolence inducing substance', 'awakened feeling' and 'fatigue' and higher inner states, comprising 'active power', 'stored information volume', 'co-owned information volume' and 'volume of reciprocal communication', are also modeled.

For example, in the following cases, the inner state is changed, as a result of which the emotional state is changed, that is, the expressive element of the state is changed.

'happiness', as when the glutted feeling is satisfied by being electrically charged;

'sadness', as when the robot apparatus is chidden on dialog with voice;

'anger', as when a force is applied from outside and the joint is coercively turned, thus increasing the pain;

'surprise', as when the activeness is increased due to changes in the biological rhythm;

'fear', as when a subject with low familiarity is found; and

'disgust', as when the activeness of the biological rhythm is low or when the battery voltage is lowered.

(3-2-2) Behavior Decision Unit

The behavior decision unit 100 selects the motion for expressing the feeling and the instinctive status, based on the input information from the feeling/instinct model 90, and for expressing the state of status recognition, based on the input information from the status recognition unit 80, while outputting a control command for controlling the light radiating device. That is, the behavior decision unit 100 calculates the color information for expressing the feeling or the state of recognition (RGB parameters) to output the so calculated color information to the behavior generating unit 110. The behavior decision unit 100 has a schema for expressing the feeling or the state of recognition, in keeping with the input information, as described above, this schema outputting the control command responsive to the input information. Or, each schema selected responsive to each input information outputs a control command matched to the own behavior. The behavior decision unit 100 calculates the control command for controlling the light radiating device, issued responsive to the input information, by the following method, and outputs the so calculated control command.

First, in controlling the light radiating device by the control command for expressing the feeling, the color (hue) and the saturation of the emitted light are changed by the color information to classify the feeling and to express the strength thereof.

The color information for expressing the feeling (the inner state) is calculated by the following process. The color hue corresponding to one having the maximum value of the six feeling values obtained from the feeling/instinct model 90 is selected. That is, the parameter of the expressive unit 'color hue' associated with the emotional state is variably controlled and, for example, the color green is selected to represent e.g. the happiness as the expressive element of the emotional state. An illustrative case of the correlation between the feeling classes and the color, that is, between the expressive elements of the emotional state and the color hue, variably controlled by parameters, is shown in the following Table 1. The state 'surprise' is expressed by hue rotation in which the totality of the colors is selected sequentially. The feeling may, in this manner, be expressed not by the single color hue, but by the sequence of selection of plural color hues.

TABLE 1

| feeling classes | happiness | sadness | anger | surprise | disgust | fear |
|---|---|---|---|---|---|---|
| hue of LED | green | light blue | red | hue rotation | orange | blue |

Then, for the selected color hue, parameter conversion is carried out for changing the saturation. Specifically, the RGB information is converted once into the HIS (hue, saturation and intensity) information and only the saturation information is subjected to subtractive conversion in a proportion of the actual value in the maximum feeling value. The HIS information is converted back into the RGB information and a command is issued to the downstream side behavior generating unit 110. In this manner, the feeling of a smaller magnitude is represented by dark color, while the feeling of a larger magnitude is represented by a bright color of high saturation. That is, the intensity of the feeling value (expressive element) is represented by the saturation with a variably controlled parameter. Thus, the intensity of the feeling may be continuously expressed by the brightness of the demonstrated color.

In case the light radiating device is controlled by a control command to express the state of visual recognition, the pattern of light emission, composed of the time duration and the period of light emission, is variably set, in dependency upon the state of visual recognition, as the color information for expressing the current emotional state (information with the adjusted hue and saturation) is kept. The expression of the state of visual recognition is demonstrated on occurrence of an event of visual recognition. Specifically, which sort of the event of the visual recognition has occurred is represented by the difference in the pattern of light emission. That is, the state of occurrence of the event of visual recognition is expressed in parallel with the emotional state, using the expressive unit of patterns of light emission which is orthogonal to the expressive unit representing the emotional state.

The event of visual recognition occurs if, on the occasion of the processing for recognizing a picture, such as face recognition or color recognition by the functional unit for visual sense recognition 81 shown in FIG. 2, it has been determined that a face, ball or a landmark is detected. By correlating the different light radiating patterns with the respective events of visual recognition (expressive elements), the states of the robot apparatus may be visually transmitted to the user, so that it becomes unnecessary to take up the voice resources during the dialog to express the state of recognition.

An illustrative case of correspondence between the events of visual recognition and the patter of light emission is shown in the following Table 2. By such difference in the light emission pattern, the user is able to comprehend whether or not the user is actually recognized by the robot apparatus, as s/he has a dialog with the robot apparatus, so that it becomes possible to realize smoother communication.

TABLE 2

| event of visual recognition | face found | ball found | landmark found |
|---|---|---|---|
| light emission pattern of light radiating device | on/off with longer period | on/off with shorter period | on/off with alternately long and short periods |

The basic method for exploiting the color (hue and saturation) and the patterns of light emission is to read-in the database pre-registered as a file and to reproduce the selected color or light emission pattern. As regards the color designation, the parameters representing the hue or the saturation may be dynamically designated and changed, as in representing the state of 'surprise'.

In the above embodiment, the expression means is the LED light radiating device. The expression means may also be a device capable of performing independent orthogonal representations on the time scale, such that a device exploiting a light emitting diode (LED), a liquid crystal display (LCD) panel, a laser diode (LD) or electro-luminescence (EL) may be used as a light radiating device, only by way of an example.

The light radiating device is not limited to the above-described device, such that it is sufficient if plural expressive units demonstrating reciprocally independent orthogonal expressions are allowed to co-exist in the sole physical resource. For example, an uttering device may be used. Such uttering device may be used in which the sound pitch, sound volume or timbre may be used as the expressive elements to enable more general expressions.

In the present embodiment, described above, two different orthogonal information, having different plural attributes to be represented by the light radiating device, for example, the emotional state (inner state) and the state of visual recognition, are represented with independent parameters on the time axis, as mutually non-interfering orthogonal expressions, namely the color (hue, saturation or intensity) and light emission patterns, so that, even though the plural information expressions co-exist in the light radiating device, as sole physical resource, there is no risk of loss of the volume of the information to be expressed, but plural information may be expressed in parallel. Moreover, since the parameters of the expressive units of the orthogonal expression means are varied independently of each other, these may be used either alone or in combination to enable more complicated and variable status expressions with the use of a smaller number of resources (herein the light radiating device).

In view of these two features, the expression means may be used to a higher efficiency to enable variegated expressions, even in the case of an entertainment robot, autonomously activated in household environments, in which limitations are imposed on the physical weight and size and loading of an excessive number of functions as expressive means for inner state representation is not possible.

If smooth real-time communication is to be achieved between the human being and the robot apparatus, such a human interface, which does not allow the state of the robot apparatus to be grasped except if plural light radiating devices need to be viewed simultaneously, may not be said to be optimum. In case the human being and the humanoid robot, explained in the present embodiment, communicate with each other by conversation, the human being directs his/her line of sight in many cases to the face of the robot apparatus. In this respect, since a light radiating device is loaded as means for expressing the inner state, on a site in register with an eye of the robot apparatus of the present embodiment, and plural inner state expressions are allowed to co-exist in the sole light radiating device, it is possible to realize smooth communication, without the human operator being conscious of the human interface.

(4) Second Embodiment

The second embodiment of the present invention is now explained. In the above-described first embodiment, the steady (temporally continuous) states of the feeling or the visual recognition, which are mutually orthogonal and different in attributes, are represented in parallel. The present second embodiment is designed to cope with and demonstrate not only the steady states but also non-steady events, that is, temporally non-continuous states. It should be noted that the robot apparatus of the resent second embodiment may be constructed similarly to the robot apparatus shown in FIGS. 1 to 17.

Figure 20:
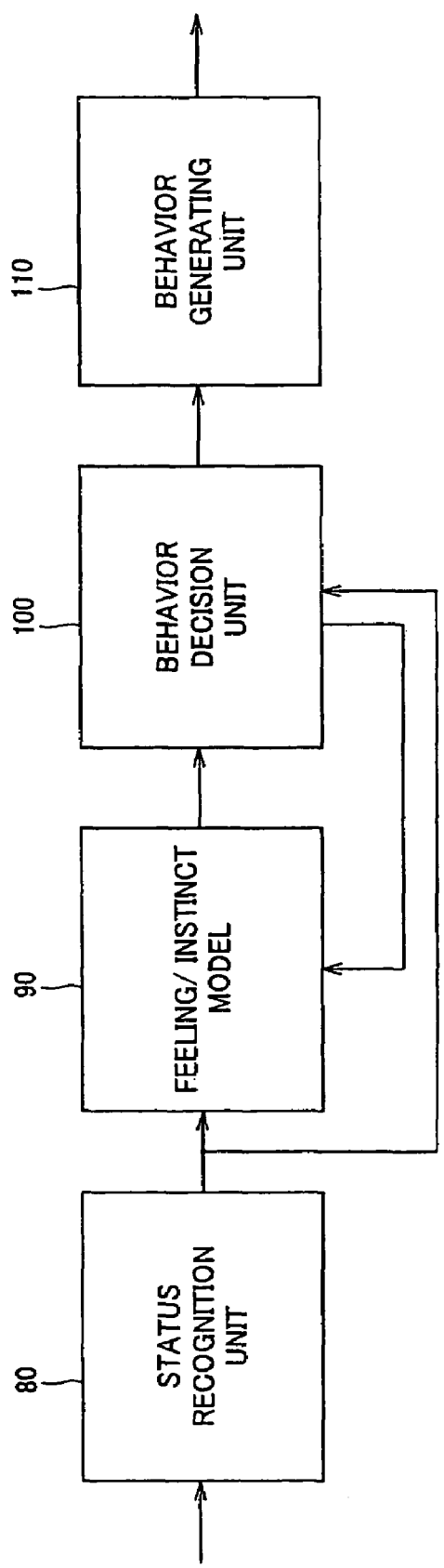
FIG. 20 is a block diagram showing respective processing units responsible for status expressions by the robot apparatus according to the first embodiment of the present invention.

In the present embodiment, the computational process which is the same as that in the first embodiment shown in FIG. 20 is involved. However, in distinction from the first embodiment, the behavior decision unit issues plural sorts of commands, different in the priority sequence, and which are predetermined in dependency upon the behavior types, as control commands output to the behavior generating unit. The behavior generating unit preferentially follows the command with higher rank in the priority sequence to act for arbitration in the competition for resources, even in case the same expressive unit has been specified simultaneously from the behavior decision unit, such that the expressions responsive to the motion when a crash event is performed under the user's command is carried out in preference to the expression matched to the motion selected on the basis of the emotional state or the state of recognition.

Figure 21:
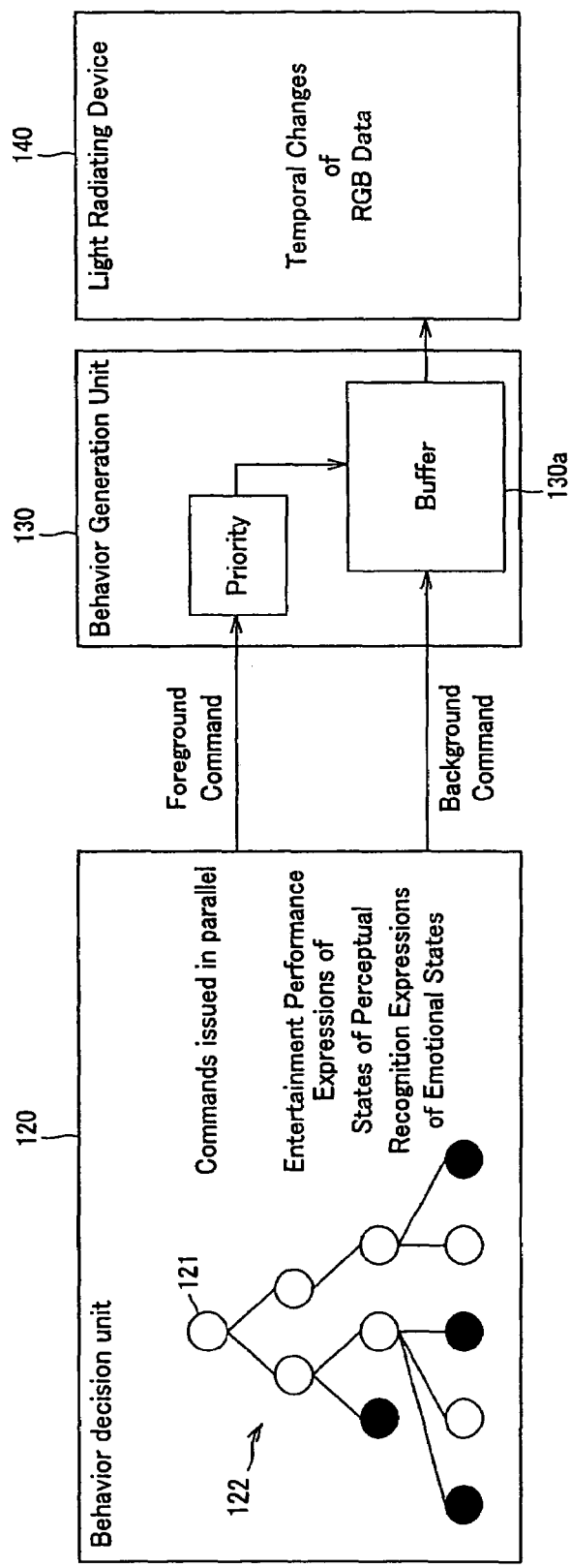
FIG. 21 is a block diagram showing respective processing units from a behavior decision unit to expression means of a robot apparatus according to a second embodiment of the present invention.

FIG. 21 is a block diagram showing respective processing units from the behavior decision unit to the expression means of the robot apparatus of the present second embodiment. As in the first embodiment, the information of the sensors loaded on the body unit of the robot apparatus is sent from the status recognition unit to the feeling/instinct model, which feeling/instinct model calculates inner state parameters, representing the own feeling and desire, in accordance with the information supplied from the status recognition unit, and sends the so calculated parameters to a behavior decision unit 120. The behavior decision unit 120 operates as command issuing means which determines the behavior based on the information supplied from the status recognition unit and the feeling/instinct model to output to a behavior generating unit 130 a control command for expressing the expressions matched to the behavior. The behavior decision unit 120 in the present embodiment uses a foreground command higher in the priority sequence or a background command lower in the priority sequence, as a control command. The behavior generating unit 130 acts as control means for arbitrating plural commands supplied from the behavior decision unit 120 for controlling the light radiating device. An LED light radiating device 140 demonstrates the state determined by the behavior generating unit 130.

(4-1) Behavior Decision Unit

The behavior decision unit 120 is explained in further detail. The behavior decision unit 120 includes a schema tree 122 comprising plural hierarchically interconnected schemas 121, which are behavior stating modules stating the motion of the robot body, as shown in FIG. 10. The respective schemas are supplied with external stimuli and inner states. The behavior decision unit selects optimum schemas, responsive to these external stimuli and to the changes in the inner state for performing behavior control, and outputs a control command for controlling the light radiating device to the behavior generating unit 130.

The behavior decision unit 120 selects an output command in order to execute the expressions matched to an occasionally produced interrupt command, in addition to expressions matched to the behavior selected on the basis of continually changing states, such as emotional states or states of visual recognition.

An interrupt event is the robot apparatus dancing responsive to a command for dancing from the user, or the robot apparatus playing a soccer game. In these events, the color or the light radiating pattern of the light radiating device is changed in keeping with the dance or the robot apparatus scoring a gall for effecting visual performance as interrupt events, by way of effecting visual performance as an interrupt command.

Thus, in effecting the performance exhibiting a conspicuous entertainment character, the robot apparatus changes the light radiating status in keeping with the body movements to raise further the visual effects of the impressions imparted to the human being.

In actuality, the robot apparatus is continually making the expressions in keeping with the motion as selected on the basis of the emotional state and the state of the visual recognition, so that, when making the expressions in keeping with the motion on occurrence of an interrupt event, an interrupt command is issued to the behavior generating unit 130 to produce an interrupt against a command already being executed to generate a command for interrupt which should overwrite the command being executed.

Thus, in the present embodiment, a background command aimed to represent steady state changes and a foreground command for interrupting these steady status representations to express status changes for coping with the event occurrence are provided as control commands for controlling the light radiating device. That is, the foreground command higher in the priority sequence is issued, on event occurrence, whilst the background command with lower in the priority sequence is issued for representing the steady state, such as feeling or the states of recognition.

This foreground command is able to output a command in preference to the background command and is also designed to permit command selection to be automatically switched such that the background command will be output at a time point of termination of the foreground command. Thus, when a control command is simultaneously notified from the plural functional modules, executed in parallel, to the light radiating device, plural commands may be multiplexed and notified in this multiplexed form. Additionally, by issuing the representations of the states on the event occurrence as a foreground command, it becomes possible to overwrite the command partway to enable interrupt representations. Moreover, by issuing the steady-state representations as the background command, there is no risk of mistaken overwriting of the preferential command. If the schema, performing the interrupt command, is selected, it demonstrates the motion (behavior) of the robot body, while issuing a command performing the status expressions matched to the own behavior as the foreground command.

In case the status representations are to be controlled by a command not provided with the priority sequence, the representations of the emotional state or the outputting of the states of visual recognition need to be halted in order to prevent the output from being overwritten as long as the visual performance to be preferred is represented by the light radiating device. It is up to the module representing steady-state expressions to check to see that a command which should be preferred is not output in order to suppress the outputting of the own command. In the present embodiment, a command issued to a sole resource needs to be provided with a rank in the priority sequence, so that, even if a plural number of such commands are multiplexed and output in the so multiplexed form, it is possible to eliminate the state of competition of command outputs among the modules run discretely in parallel. That is, since the foreground command is automatically preferentially selected, it is possible to omit the processing for the background command issuing side to monitor the output state of the foreground side to evade the background command overwriting the foreground command.

The conventional practice has been to issue a control command for the LED light radiating device only at a timing corresponding to changes in the expressions, such that the light radiating device holds the state of the command issued last time. Thus, in case an interrupt is applied to the pre-existing command to terminate the outputting of this pre-existing command, it is necessary to restore the state which prevailed before the interrupt. Consequently, the module which issued the command, terminated by the interrupt, has to monitor the state of interrupt completion from the other module to re-issue the command at a timing the interrupt has been finished. Conversely, with the present embodiment, command selection is instantaneously switched to the background command at a time point of completion of the foreground command. Thus, the module (schema) making steady-state expressions may output a command, without monitoring the timing of beginning and end of the outputting of the foreground command, adapted for effecting status expressions at the time of the interrupt event, so that, in the processing for outputting the background command, the processing for grasping the end timing of the foreground command as well as the processing of again outputting the background command may be omitted.

In case plural control commands with different ranks in the priority sequence are simultaneously issued, the command with the higher rank in the priority sequence takes precedence. With plural control commands having the same rank in the priority sequence, the information showing orthogonal expressions, such as the color information (hue and saturation) and the patterns of light emission, may be set independently, by employing expression means capable of orthogonal expressions, as shown in FIG. 19, so that plural orthogonal states can be expressed in parallel, as in the first embodiment. For example, in a schema tree 122, the dance schema, the feeling expressing schema and the dialog schema are booted simultaneously in parallel, responsive to the respective activation levels or recognition events. As regards the LED light radiating device (LED resource), if plural commands, having the rank in the priority sequence in the same layer, are issued simultaneously, these commands may merge simultaneously, as long as virtually set resources, as later explained, are not overlapped with one another in the LED resource. Thus, if, the state of recognition that the face of a human has been found is demonstrated, changes in the emotional state that have occurred may be represented, as in the first embodiment.

Figure 22:
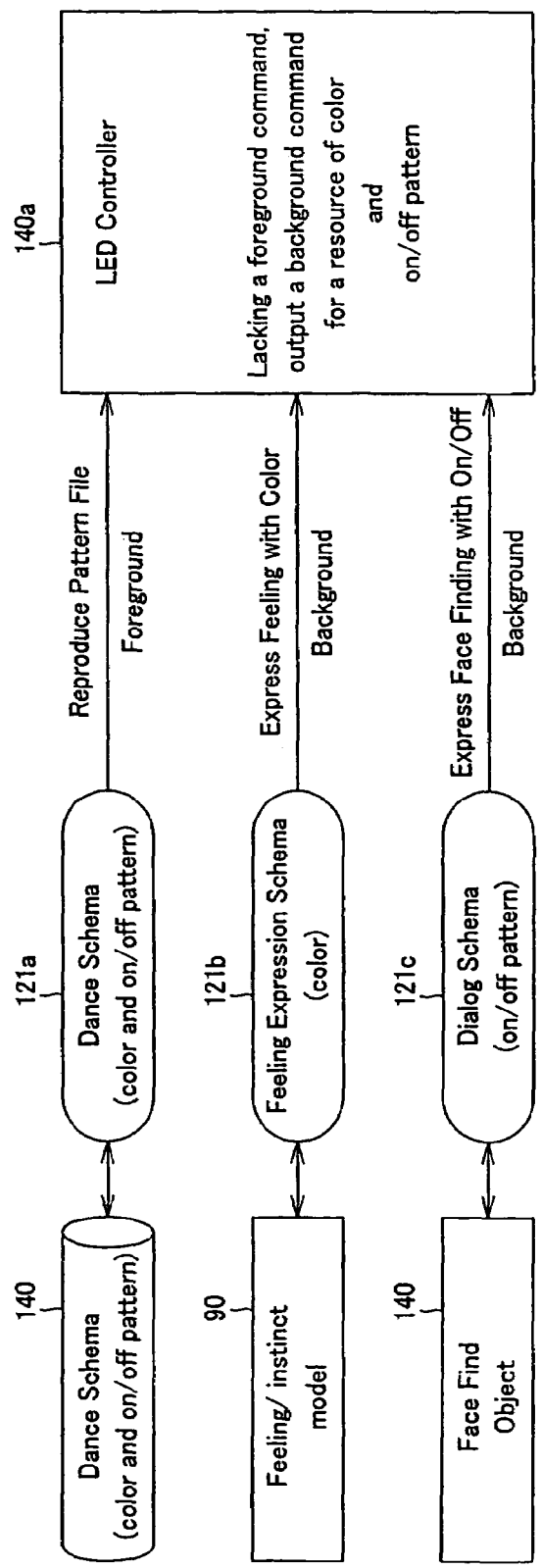
FIG. 22 illustrates the relationship between specified examples of the schemas issuing an LED command and the method of using the resource.

FIG. 22 illustrates the relationship between a specified instance of a schema issuing an LED command and the method of employing the resource. If the finding of a face by a face find object 81a of the functional unit for visual sense recognition has been notified in a dialog schema 121c, a command specifying the pattern of light emission for the LED light radiating device 19 is issued as the background command, in order to express this state of visual recognition 'face found'. A feeling expressing schema 121b monitors changes in the feeling during the dialog and issues a command for sequentially specifying the lighting color of the LED light radiating device, as the background command, based on the feeling value from the feeling/instinct model 90. As explained in connection with the above-described first embodiment, since the LED light radiating device having plural orthogonal expressive units is used in such case, resource competition is not produced, and the commands merge together, such that the patterns of light emission may be reproduced with the prevailing emotional state color.

In this manner, steadily changing states, such as expressions of the emotional states or of the states of recognition, if not reproduced, do not render the statuses of the robot apparatus excessively unnatural, and hence are set to use background resources of the LED.

Conversely, if the non-steady statuses, such as interrupt events, that should take precedence, have occurred and are to be expressed, that is, if an event is requested to be executed at any rate in view of the crucial character as the event, a command is issued by exploiting the foreground resource of the LED. Referring to FIG. 22, in case an interrupt event 'dancing' has occurred, the dance schema 121a issues, as a foreground command, a command for reproducing a pattern file from an LED replay data for dancing 140 and for extensively changing the color emitted by the LED light radiating device during the dance event. Since this foreground command overwrites the background command, it becomes possible to apply interrupt to the background command, such as emotional state expressions, so far output, thus enabling the LED pattern of the dance event to be output.

(4-2) Behavior Generating Unit

The behavior generating unit 130 is now explained in further detail. The behavior generating unit 130 accepts plural control commands different in the priority sequence from the behavior decision unit 120 and executes arbitration processing for actually outputting commands by way of controlling the light radiating device. That is, by these commands, the hue, color and the pattern of light emission, for example, are controlled. The behavior generating unit 130 is able to accept plural control commands in which the color information (color hue and saturation) and the pattern of representations, specifying the light radiating time duration and the period of light radiation, are set as two virtual resources, for a sole physical resource, which is the light radiating device, and the different ranks in the priority sequence are set to these two virtual resources.

Figure 23:
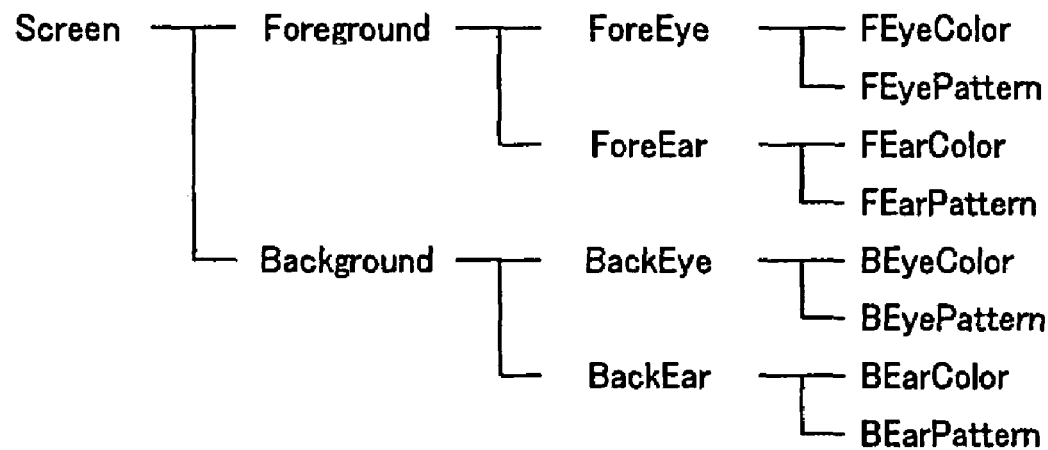
FIG. 23 shows a resource tree map.

First, these virtual resources, namely the background resource for making expressions in meeting with the above-described steady state (inner state and the state of visual recognition) and the foreground resource for making expressions in meeting with the state to be performed in preference to the steady state (state of occurrence of an interrupt event) are further explained in detail. FIG. 23 shows a resource map.

The resource set in an LED controller 140a shown in FIG. 22 to accept commands from respective schemas is defined by a hierarchical structure shown in FIG. 23. The resource has two levels with different ranks in the priority sequence, namely the foreground level and the background level, and is designed so that no resource competition occurs after all in the foreground level or in the background level. Thus, no priority sequence is set.

Moreover, the foreground resource and the background resource are each classified into an eye resource and an ear resource. Moreover, a color resource and a light emission pattern resource (on/off pattern resource) are set for each of the eye and ear resources and, as long as the resources do not overlap with one another, the control commands from the eye and ear resources are merged to decide on the output states.

That is, the behavior generating unit 130 includes a buffer 130a for merging these control commands, and merges the commands in keeping with the rank in the priority sequence. In the present embodiment, the behavior decision unit 120 issues one of two sorts of control commands, in association with two resources, namely the foreground resource and the background resource. The behavior generating unit 130 owns two buffers (a double buffer), associated with these two sorts of the control commands, and the commands are merged in this buffer 130a.

Which command corresponding to which rank in the priority sequence is to be issued and used for controlling the expressions selected in the behavior decision unit 120, that is, the which expression corresponding to which motion is to be preferentially demonstrated, is predetermined. In the present embodiment, the expressions in keeping with the motion selected based on the emotional state or the results of visual recognition, that is, the steadily made expressions, use the background resource, whereas, the expressions in keeping with the interrupt event, such as the dance event, use the foreground resource with the higher rank in the priority sequence. The aforementioned behavior decision unit 120 selects the foreground command or the background command, whichever is relevant, to issue the so selected command. The rank in the priority sequence may be pre-set from schema to schema. Alternatively, which level priority command should be used may be selected by each schema based on predetermined conditions. Such selection may also be made by the user as necessary.

Figure 24A:
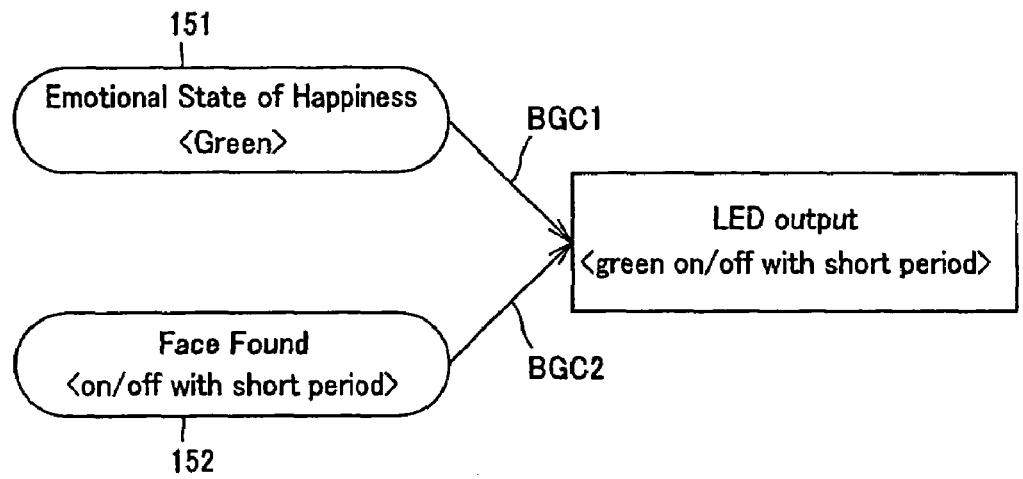
FIG. 24A shows a case where there is no competition for resources, that is a case where a command is issued from the same layer, and 24B shows a case where there is competition for resources, that is a case where command overwrite occurs.
Figure 24B:
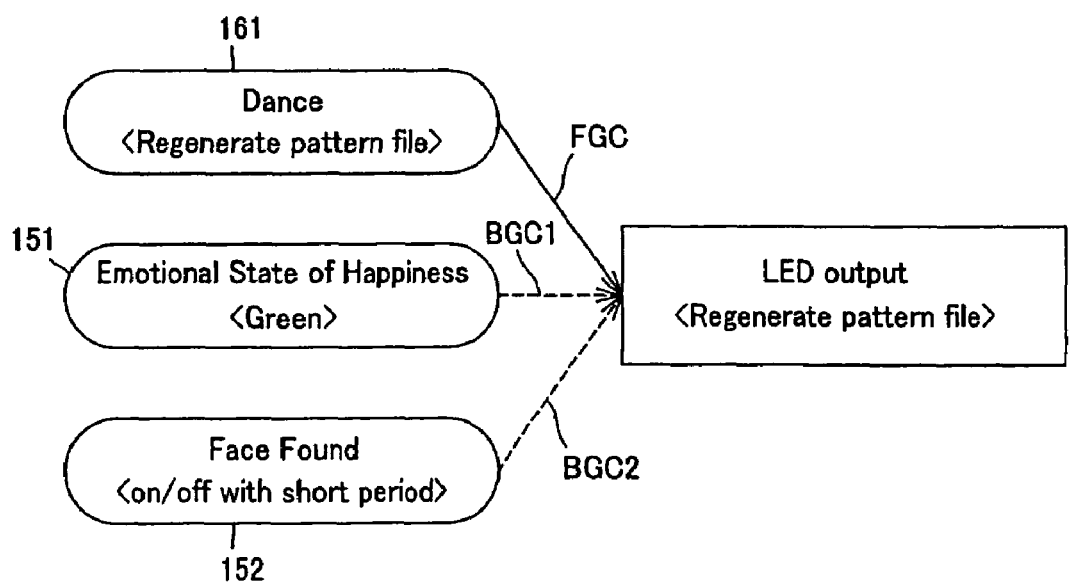

FIG. 24A shows an embodiment in which a command exploiting only the resource in the foreground layer and a command exploiting only the resource in the background command are merged and output without competition for the resources, and FIG. 24B shows an embodiment in which a foreground command is issued in a state a background command has been issued to lead to resource competition and to overwriting of the background command.

If only the resources in the same layer, that is, in the foreground layer or in the background layer, are used, no resource competition occurs. If, as shown in FIG. 24A, background commands BGC1 and BGC2 are output for expressing a emotional state for 'happiness' 151 and the state of visual recognition for 'a face found' 152 (event output) with the use of the background resources, the two states may be expressed in parallel, with the two outputs then being merged and the LED light radiating device flickering in green color.

If, during outputting the emotional state for 'happiness' 151 and the state of visual recognition for 'a face found' 152, expressed using the background resources shown in FIG. 24A, a foreground command FGC is output from an interrupt event 'dance' 161, the background commands BGC1 and BGC2 are overwritten and the expressions of the emotional state 151 and the state of visual recognition 152 are interrupted to output an LED pattern making the expressions corresponding to the interrupt event 161 'dance' to reproduce an LED pattern file.

(4-2-1) Specified Examples of Commands

Certain specified examples of the background command (BG command) and the foreground command (FGC) are now explained. Here, the case in which four commands, namely a BG command (color), an FG command (color), each specifying the color (hue and saturation), a BG command (patterns of light emission), and an FG command (patterns of light emission), each specifying the patterns of light emission, have been issued, are explained. These four commands are designed as follows:

BG command (color): the color state is maintained if once the command is issued;

BG command (patterns of light emission): one light emission pattern is reproduced when the command is issued;

FG command (color): this command, if issued, overwrites the BG command (color) and remains valid as long as it is issued; when the command comes to a close, reversion is made to the BG command (color);

FG command (patterns of light emission): this command, if issued, overwrites the BG command (patterns of light emission) to generate one light emission pattern; when the command comes to a close, such a state is set in which the BG command (patterns of light emission) may also be output.

That is, in case expressions are made using the same expressive unit (resource) in the same expression means is used for making expressions, the BG command is overwritten, because the outputting of the FG command takes precedence over the BG command. In the present embodiment, the color command and the command for a pattern of light emission may be expressed orthogonally. For example, when the BG command (color) and the FG command (pattern of light emission) are output, the resources are not in competition, however, if an FG command is output, the expressions by the totality of the BG commands are terminated. Meanwhile, in case plural commands which do not produce the resource competition and which differ in the priority sequence are output simultaneously, that is, if, after an FG command is issued, a BG command exploiting the expressive unit different from those of the FG command is issued, such a setting may be made in which the expressions by the BG command are sustained. In such case, it is sufficient that, in the control commands having the same priority sequence and performing control using the same expressive unit, the current command is overwritten by the latest command.

FIG. 25 shows the priority sequence of the commands. Here, the BG commands are commands for controlling the expression means using the same expressive unit, while the FG commands are also commands for controlling the expression means using the same expressive unit. Thus, since the resources compete with one another, the command with higher priority sequence overwrites the command with a low priority sequence, whereas, with the commands with the same priority sequence, the latest command always overwrites the previous commands. That is, if only a BG command is issued and another BG command is subsequently issued, the prevailing command is overwritten by the latest command. In similar manner, if an FG command has been issued subsequently, the FG command overwrites the previous FG command.

If only the FG command has been issued, it is kept, without overwriting, even if a BG command is subsequently issued. However, if subsequently an FG command is issued, the previous FG command is overwritten by the subsequently issued FG command.

If a BG command and an FG command are issued simultaneously, the FG command so issued takes precedence, such that, if a BG command is subsequently issued, the FG command is not overwritten, but keeps on to be a previous command, however, if an FG command is subsequently issued, the previous FG command is overwritten by the subsequent FG command.

Figure 26:
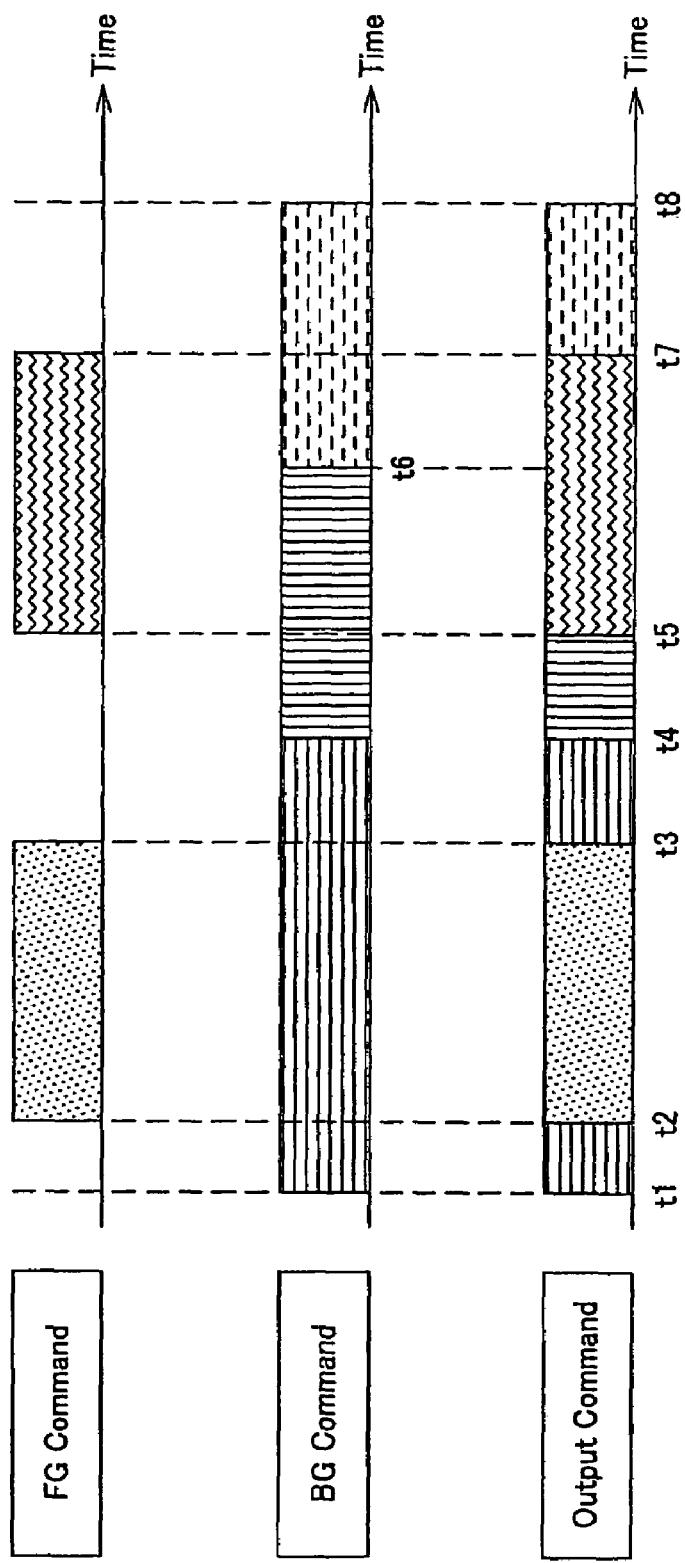
FIG. 26 illustrates a foreground command (FG) and a background command (BG), supplied to a behavior generating unit of a robot apparatus in a second embodiment of the present invention, and an output command arbitrated and output by the behavior generating unit.

FIG. 26 shows FG and BG commands, supplied to the behavior generating unit, and output commands output after arbitration by the behavior generating unit. Referring to FIG. 26, if FG commands are issued during time t2-t3 and time during t5-t7, and sent to the behavior generating unit 130, and BG commands are issued during time t1-t4, t4-t6 and t6-t8, and similarly sent to the behavior generating unit 130, the behavior generating unit issues the FG command, in preference to the BG command, as explained with reference to FIG. 25. If the commands of the same layer are issued, the subsequent command which has overwritten the previous command is issued as an output command. That is, the BG command is issued during time t1-t2, the FG command is issued during tie t2-t3, the BG commands are issued during time t3-t4 and t4-t5, the FG command is issued during time t5-t7 and the BG command is issued during time t7-t8, as output commands, to the LED controller, which then controls the LED light radiating device by these output commands.

In this manner, the sole LED light radiating device is classified into two virtual resource layers, namely the background resource and the foreground resource, and the behavior generating unit 130 processes the multiplexed two sorts of the commands by way of arbitration to prohibit competition of these resources.

In the present embodiment, commands may be multiplexed by providing the control command for the light radiating device with a rank in the priority sequence, while the switching control between plural simultaneously output commands may be facilitated. Specifically, the background command is used for expressing the emotional state or the state of perceptual recognition, the perpetual expression of which is not mandatory but is desirable, whilst the foreground command higher in the rank in the priority sequence than the background command is used for expressing the contents which are required to be executed by applying an interrupt to the output state of the background command, and the end state of which is definite, such as dance performance or singing performance. By setting different ranks in the priority sequence in the commands for outputting the expressions of the state of visual recognition and the emotional state to be steadily expressed and the commands for outputting the expressions of the visual performance to be preferentially made as an interrupt command, it becomes unnecessary to monitor the state of execution of the foreground command from the module issuing the background command, thereby simplifying the program in module designing. If the LED light radiating device, capable of orthogonal expressions, is used as expression means, as in the first embodiment, it becomes possible to represent plural orthogonal expressions in parallel simultaneously.

(5) Other Embodiments

The present invention is not limited to the above-described embodiments and various modifications are naturally possible without departing from the scope of the invention. For example, although two sorts of commands having different ranks in the priority sequence, namely the foreground command and the background command, are provided, and two buffers are provided for accepting these commands, which commands are merged to arbitrate the competition for the resources, the present invention is not limited to the embodiment of providing two buffers, that is, two sorts of commands, but may be extended to a more general embodiment employing n buffers, that is n sorts of commands different in the priority sequence.

It is presupposed that the command herein means a command having a preset valid time duration for reproducing e.g. a file, and that, if no command is output after the end of the preceding command, the state of the last output command is to be sustained.

For example, if a command is issued for transition to a turn-on state, in a certain priority layer, the last command end state is maintained until a definite command to turn off the light is output or the command is overwritten by a command of the layer higher in the priority sequence. If, under this presupposition, there lacks the upper command with the higher rank in the priority sequence, the command of the lower layer with a lower rank in the priority sequence is to be valid. By such scheme, the n-layer concept remains valid. That is, the concept of plural buffers may be extended in the expression means of e.g. the light radiating device.

In the above-described first and second embodiments, the light radiating device is taken as an example of the expression means. The expression means may, however, be an expression means having plural orthogonal expressive units which may be expressed in parallel. Thus, the expression means may, for example, be an uttering device.

What is claimed is:
1. A robot apparatus for performing autonomous motion based on inner states and external stimuli, comprising
expression means for producing a plurality of expressions;
wherein the expression means comprises a plurality of expressive units which are capable of producing on a time axis a plurality of orthogonal expressions which are independent of each other, wherein the plurality of orthogonal expression comprises feeling classes, feeling intensity, and states of perceptual recognitions, correlating means for correlating a plurality of orthogonal states, which are based on said inner states and external stimuli, with at least one of said plurality of expressive units; and control means for controlling said expression means for representing the plural orthogonal states in parallel, using the correlated expressive units.

2. The robot apparatus according to claim 1 wherein said control means control said expression means using one or more of the expressive units having parameters variably controlled responsive to each expressive element of said inner states.

3. The robot apparatus according to claim 1 wherein said expression means comprises a light radiating device and wherein the plural expressive units, capable of orthogonal expressions independently of one another, comprise two or more of color hue, saturation, intensity and patterns of light emission.

4. The robot apparatus according to claim 3, wherein the robot apparatus has an appearance simulating an animal, and wherein said light radiating device is provided at a location corresponding to an eye of the robot apparatus.

5. The robot apparatus according to claim 1 wherein said expressive means comprises an uttering unit and wherein the plural expressive units, capable of producing orthogonal expressions independent of one another, comprise two or more of the sound pitch, sound volume and rhythm.

6. The robot apparatus according to claim 1 wherein said correlating means outputs said correlation by control commands having different priority ratings;

wherein upon issuance of plural control commands, having different priority ratings, prioritizing the control command having a higher priority rating.

7. A robot apparatus for selecting and executing at least one of a plurality of motions, comprising:

expression means for producing a plurality of expressions;

command issuing means for issuing a control command on motion selection, wherein said control command has a priority rating and correlates said expressive units with the selected motion; and control means for controlling said expression means by said control command;

wherein upon issuance of plural control commands having different priority ratings said control means controls said expression means in accordance with the control command having a higher priority rating, wherein when a plurality of commands have the same priority ratings, information showing orthogonal expressions are set independently so that a plurality of orthogonal states are expressed in parallel.

8. The robot apparatus according to claim 7 wherein, if a first control command having a higher priority rating than a second control command currently controlling the expression means is issued, said control means interrupts the expressions to control the expression means in accordance with the first control command having a higher priority rating.

9. The robot apparatus according to claim 8 wherein said control means re-initiates the interrupted expressions when the expression related to the first control command having a higher priority rating ends.

10. The robot apparatus according to claim 7 wherein said command issuing means further comprises:

a plurality of behavior stating modules stating the motions of a robot body;

wherein when one of the behavior stating modules is selected, the selected behavior stating module issues a third control command having a priority rating that matches the motion of the robot body.

11. The robot apparatus according to claim 10 wherein a control command issued by the behavior stating module selected on the basis of a command from outside the robot has a higher priority rating than a control command issued by the behavior stating module selected on the basis of an inner state of the robot or a state of recognition.

12. The robot apparatus according to claim 7 wherein the expression means comprises a plurality of expressive units which are capable of producing on a time axis a plurality of orthogonal expressions which arc independent of each other, wherein the plurality of orthogonal expression comprises feeling classes, feeling intensity, and states of perceptual recognitions.

13. A method for expression by a robot apparatus capable of performing autonomous motions based on inner states and external stimuli, said method comprising:

correlating a plurality of orthogonal states, which are based on said inner states and external stimuli, with at least one of a plurality of expressive units, which are owned by expression means and which are capable of producing on a time axis a plurality of orthogonal expressions which are independent of each other and;

controlling said expression means for representing the plural orthogonal states in parallel, using the correlated expressive units, and wherein the plurality of orthogonal expressions comprise feeling classes, feeling intensity, and states of perceptual recognitions.

14. The method according to claim 13, further comprising:

controlling said expression means by expressive elements, wherein the parameters of the expression means are variably controlled responsive to respective expressive elements of said inner states.

15. The method according to claim 13 wherein, the correlation step further comprises:

outputting the correlation by control commands, having a priority rating; and prioritizing the control command having a higher rating.

16. A method for expression by a robot apparatus in which at least one of a plurality of motions is selected and executed, said method comprising:

a command issuing step of issuing, on motion selection, a control command in which an expressive unit variably controlled by a parameter and owned by expression means is correlated with the selected motion;

controlling said expression means by said control command, and wherein said control command has a priority rating;

wherein upon issuance of plural control commands having different priority ratings said control means controls said expression means in accordance with the control command having a higher priority rating, wherein when a plurality of commands have the same priority ratings, information showing orthogonal expressions are set independently so that a plurality of orthogonal states are expressed in parallel.

17. The method according to claim 16 wherein if, a first control command having a higher priority rating than the second control command currently controlling said expression means in the expressing operation is issued, the expression is interrupted and the expression means is controlled by the first control command having the higher priority rating.

18. The method according to claim 17 wherein the interrupted expression is re-initiated when the expression corresponding to the first control command having a higher priority rating ends.

* * * * *